US012691522B2

(12) United States Patent
Benzing et al.

(10) Patent No.: US 12,691,522 B2
(45) Date of Patent: Jul. 28, 2026

(54) STUD WELDING FERRULE AND APPARATUS

(71) Applicant: Structural Services, Inc., Bethlehem, PA (US)

(72) Inventors: James T. Benzing, Bethlehem, PA (US); William R. Haller, Bethlehem, PA (US)

(73) Assignee: Structural Services, Inc., Bethlehem, PA (US)

( * ) Notice: Subject to any disclaimer, the term of this patent is extended or adjusted under 35 U.S.C. 154(b) by 1164 days.

(21) Appl. No.: 17/528,778

(22) Filed: Nov. 17, 2021

(65) Prior Publication Data

US 2022/0152723 A1 May 19, 2022

Related U.S. Application Data

(60) Provisional application No. 63/114,882, filed on Nov. 17, 2020.

(51) Int. Cl.
*B23K 9/095* (2006.01)
*B23K 9/20* (2006.01)

(52) U.S. Cl.
CPC .................................. *B23K 9/201* (2013.01)

(58) Field of Classification Search
CPC .............................. B23K 9/095; B23K 26/032
See application file for complete search history.

(56) References Cited

U.S. PATENT DOCUMENTS

| | | | | |
|---|---|---|---|---|
| 2013/0206740 A1* | 8/2013 | Pfeifer | .................... | G01S 11/14 |
| | | | | 356/28 |
| 2014/0259600 A1* | 9/2014 | Kilibarda | ............... | G01N 21/84 |
| | | | | 29/407.04 |
| 2015/0347854 A1* | 12/2015 | Bare | ......................... | G01S 5/00 |
| | | | | 345/633 |
| 2016/0104046 A1* | 4/2016 | Doettling | ............... | F16M 13/02 |
| | | | | 382/103 |
| 2016/0214199 A1* | 7/2016 | Benzing | ................. | B23K 26/08 |
| 2017/0291242 A1* | 10/2017 | Benzing | .................. | B25J 9/023 |
| 2019/0201998 A1* | 7/2019 | Benzing | ................. | B23K 26/08 |

* cited by examiner

*Primary Examiner* — Ibrahime A Abraham
*Assistant Examiner* — Lawrence H Samuels
(74) *Attorney, Agent, or Firm* — Saxton & Stump, LLC

(57) ABSTRACT

A system for automatically identifying one or more welding site locations on a surface of a target metal marked with a plurality of welding site candidates, includes an imager configured to acquire an image of the surface of the target metal, wherein the acquired image includes a plurality of pixels each having a corresponding intensity value; and a processing circuit configured to: compare each intensity value to an intensity threshold, identify a plurality of pixel clusters, wherein each pixel cluster is made up of contiguous pixels that have intensity values that are equal to or greater than the intensity threshold, for each pixel cluster, determine whether a total pixel area of the pixel cluster is less than a threshold pixel area, and remove any pixel cluster from consideration as a welding site location if the total pixel area of the pixel cluster is less than the threshold pixel area.

9 Claims, 25 Drawing Sheets

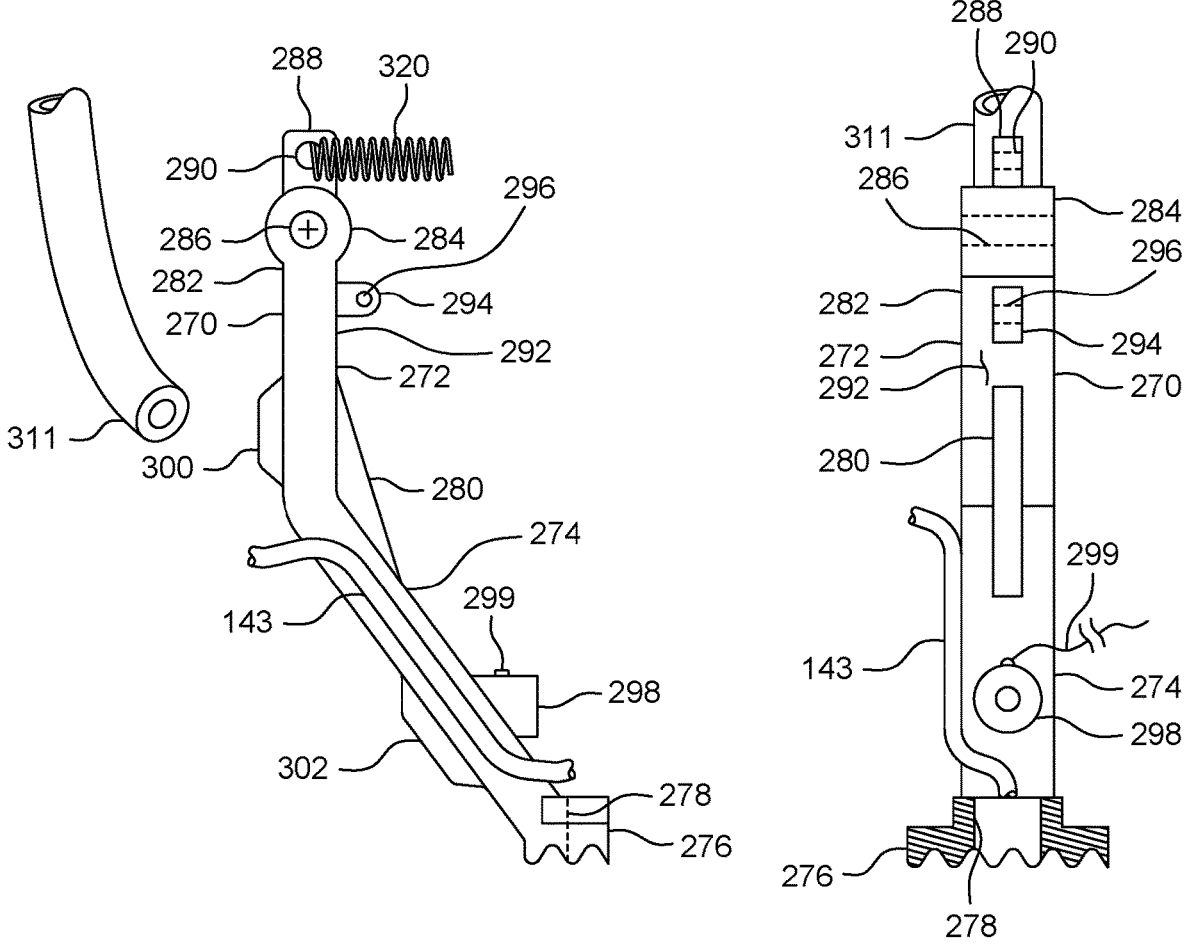
FIG. 6A                    FIG. 6B

467   Label "9"

475   Label "6"

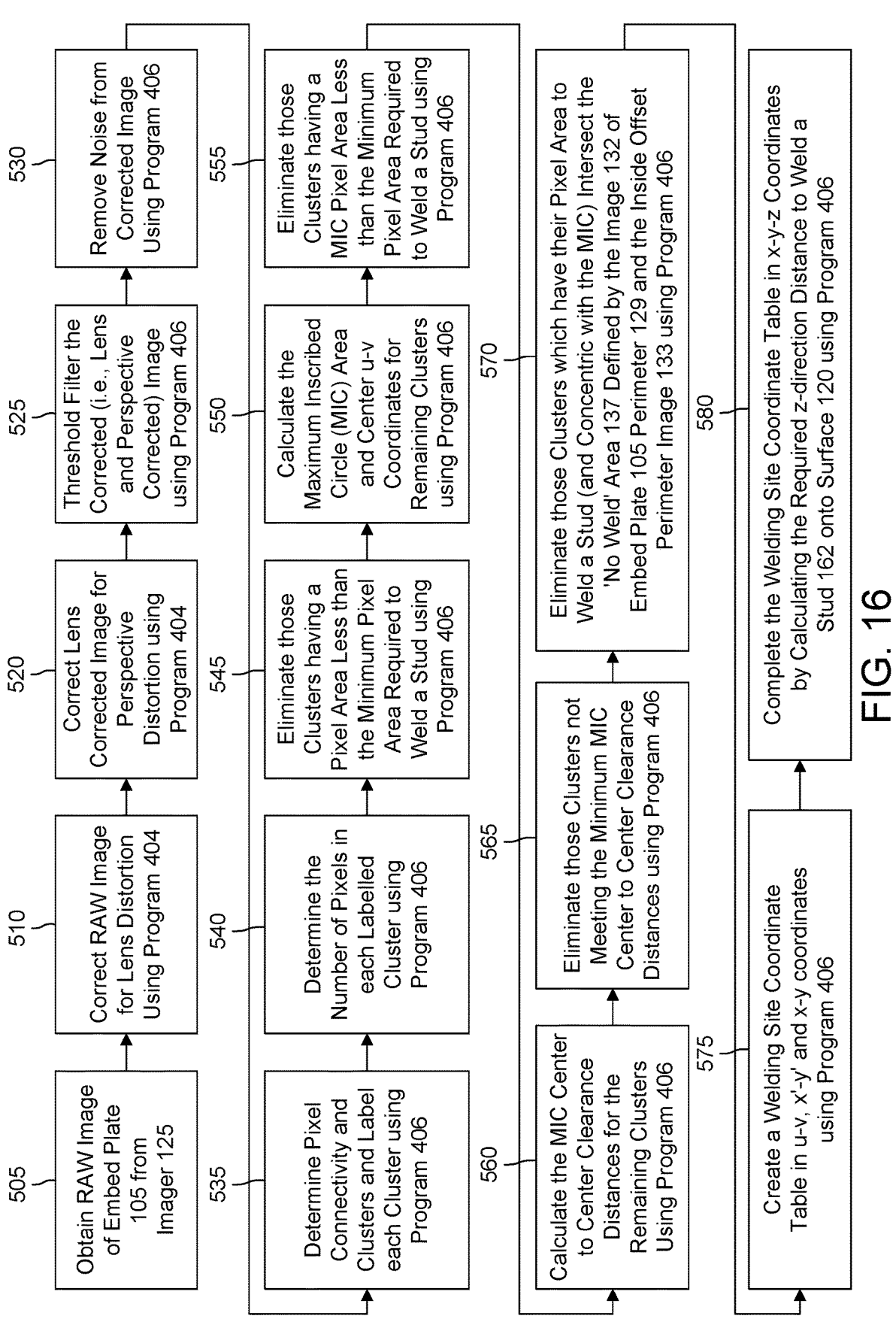

FIG. 16

505 — Obtain RAW Image of Embed Plate 105 from Imager 125

510 — Correct RAW Image for Lens Distortion Using Program 404

520 — Correct Lens Corrected Image for Perspective Distortion using Program 404

525 — Threshold Filter the Corrected (i.e., Lens and Perspective Corrected) Image using Program 406

530 — Remove Noise from Corrected Image Using Program 406

535 — Determine Pixel Connectivity and Clusters and Label each Cluster using Program 406

540 — Determine the Number of Pixels in each Labelled Cluster using Program 406

545 — Eliminate those Clusters having a Pixel Area Less than the Minimum Pixel Area Required to Weld a Stud using Program 406

550 — Calculate the Maximum Inscribed Circle (MIC) Area and Center u-v Coordinates for Remaining Clusters using Program 406

555 — Eliminate those Clusters having a MIC Pixel Area Less than the Minimum Pixel Area Required to Weld a Stud using Program 406

560 — Calculate the MIC Center to Center Clearance Distances for the Remaining Clusters Using Program 406

565 — Eliminate those Clusters not Meeting the Minimum MIC Center to Center Clearance Distances using Program 406

570 — Eliminate those Clusters which have their Pixel Area to Weld a Stud (and Concentric with the MIC) Intersect the 'No Weld' Area 137 Defined by the Image 132 of Embed Plate 105 Perimeter 129 and the Inside Offset Perimeter Image 133 using Program 406

575 — Create a Welding Site Coordinate Table in u-v, x'-y' and x-y coordinates using Program 406

580 — Complete the Welding Site Coordinate Table in x-y-z Coordinates by Calculating the Required z-direction Distance to Weld a Stud 162 onto Surface 120 using Program 406

Figure 17B:
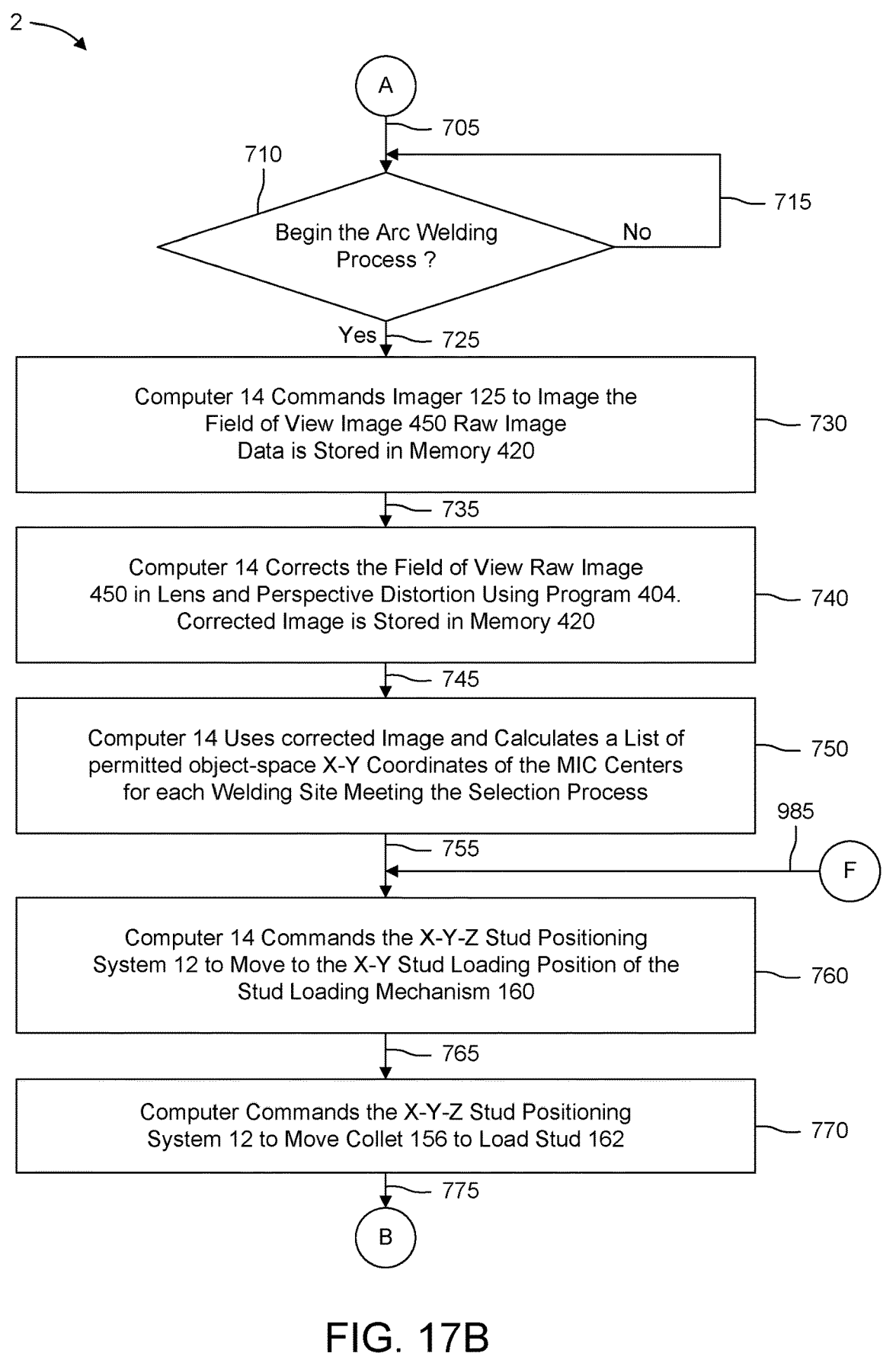

2

A

— 705

710

Begin the Arc Welding
Process ?                    No          — 715

Yes — 725

Computer 14 Commands Imager 125 to Image the
Field of View Image 450 Raw Image
Data is Stored in Memory 420          — 730

— 735

Computer 14 Corrects the Field of View Raw Image
450 in Lens and Perspective Distortion Using Program 404.
Corrected Image is Stored in Memory 420          — 740

— 745

Computer 14 Uses corrected Image and Calculates a List of
permitted object-space X-Y Coordinates of the MIC Centers
for each Welding Site Meeting the Selection Process          — 750

985

— 755          F

Computer 14 Commands the X-Y-Z Stud Positioning
System 12 to Move to the X-Y Stud Loading Position of the
Stud Loading Mechanism 160          — 760

— 765

Computer Commands the X-Y-Z Stud Positioning
System 12 to Move Collet 156 to Load Stud 162          — 770

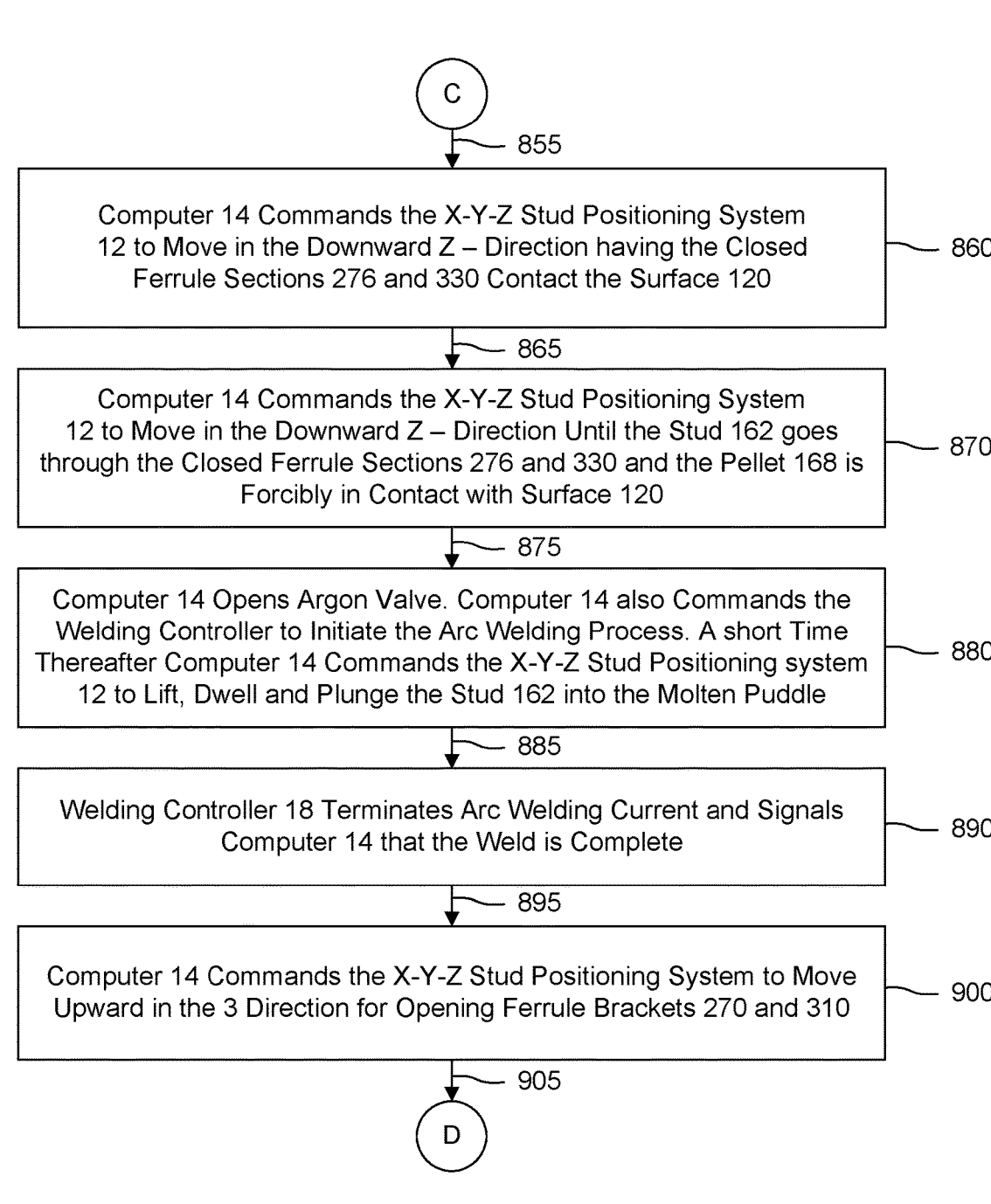

4

C

855

Computer 14 Commands the X-Y-Z Stud Positioning System 12 to Move in the Downward Z – Direction having the Closed Ferrule Sections 276 and 330 Contact the Surface 120     860

865

Computer 14 Commands the X-Y-Z Stud Positioning System 12 to Move in the Downward Z – Direction Until the Stud 162 goes through the Closed Ferrule Sections 276 and 330 and the Pellet 168 is Forcibly in Contact with Surface 120     870

875

Computer 14 Opens Argon Valve. Computer 14 also Commands the Welding Controller to Initiate the Arc Welding Process. A short Time Thereafter Computer 14 Commands the X-Y-Z Stud Positioning system 12 to Lift, Dwell and Plunge the Stud 162 into the Molten Puddle     880

885

Welding Controller 18 Terminates Arc Welding Current and Signals Computer 14 that the Weld is Complete     890

895

Computer 14 Commands the X-Y-Z Stud Positioning System to Move Upward in the 3 Direction for Opening Ferrule Brackets 270 and 310     900

STUD WELDING FERRULE AND APPARATUS

FIELD

This present invention relates generally to arc welding equipment for manually or robotically welding studs to a beam, girder, embed plate or other base metal surface at a welding site, and in particular, to stud arc welders which incorporate a reusable ferrule for containing and molding the molten metal in addition to shielding the weld from atmospheric gases.

BACKGROUND

It is well known in the arc welding art that the process to weld a stud to a beam, girder or other base metal surface first begins by preparing the welding site by removing any surface contaminants which may include rust and paint. This process insures a clean metallic surface having good electrical conductivity and is usually accomplished by grinding the contaminant surface of the base metal. A conventional ceramic ferrule is then manually positioned on top of the cleaned welding site. The placed ferrule identifies the welding site location.

The head of the stud is then concentrically inserted into an electrically conducting collet either manually for a conventional welding gun or automatically for a robotically controlled welder. The collet and stud concentric combination are then vertically positioned over the ferrule. A downward force then moves the collet and stud concentric combination towards the ferrule. As the collet and stud combination moves in a downward direction, a ferrule alignment bracket first spring-ably engages the top of the ferrule concentrically aligning and fixing the position of the ferrule with respect to the collet and stud concentric combination.

The collet and stud continue with a downwardly directed vertical movement inserting the shank of the stud into the concentrically aligned ferrule. Downward vertical motion of the stud continues until the bottom surface of the shank is firmly and spring-ably pressed against the clean top surface of the base metal.

At this point the shank of the stud has been concentrically inserted into the ferrule and is firmly seated perpendicular to the clean base metal surface making a good electrical connection between the collet and stud combination and the base metal surface. The welder is then activated either by a welder operator depressing the welding gun trigger or automatically by the robotic welder.

Activating the welder initiates a pilot arc between the bottom area of the stud shank and the base metal surface for a short amount of time after which a large welding current is then permitted to flow.

As the large welding current flows a high temperature arc is produced which melts both the bottom of the stud shank and the surface of the base metal forming a pool of molten metal. The molten metal is confined around the base of the stud shank by the ferrule. The ferrule also concentrates the heat generated by the arc and additionally protects the molten metal from atmospheric gases which may cause oxidation of the molten metal. The stud is then slightly lifted and then downwardly forced into the pool of molten metal by the welder and allowed to solidify. After solidification, the stud and base metal are now welded together.

The ferrule is then removed from the base of the weld by manually fracturing the side of the ferrule with an object such as a hammer, or in the case of a robotic welder by automatically fracturing the ferrule with a mechanically operated hammer. With this current welding process one ferrule is consumed for each welded stud.

There are many disadvantages associated with using conventional ferrules during the welding process. The ferrule must first be positioned on top of the welding site before the welding process commences. This involves identifying the welding site, correctly orienting the ferrule over the welding site, and then placing the ferrule on top of the welding site. At this point it is assumed that the ferrule location is the same as the welding site location.

This process is time consuming and increases labor costs. Additionally, the ferrule is removed after each welded stud further increasing both the time and cost to complete a weld. A ferrule which can be repeatedly used (a reusable ferrule) is therefore very desirable and economically beneficial to the welding industry.

There are several factors to consider in the design of a reusable ferrule and include the working temperature and the mechanical strength of the ferrule material. A reusable ferrule must have material properties which can withstand repeated exposures to high arc welding temperatures. Additionally, the reusable ferrule must maintain sufficient mechanical strength at the high arc welding temperatures to allow a mechanism to repeatedly position the ferrule sections both around the shank of each stud and on top of the respective welding site.

To successfully replace the expendable ferrule, the reusable ferrule must be synergistically and cooperatively matched with the ferrule positioning mechanism. The reusable ferrule must also be economical to manufacture and easily replaceable in the field.

Another consideration in the design of a welding apparatus which incorporates a reusable ferrule is the method used to identify a suitable welding site. In the prior art and previously mentioned above, welding sites have been located by assuming that the location of the ferrule defines the location of the welding site. The welding site location is therefore assumed to be the same as the ferrule location. A misplaced ferrule on the base metal surface therefore erroneously gives an incorrect welding site location. Additionally, with a reusable ferrule, the welding site location is not defined by the ferrule location simply because the reusable ferrule is moved from welding site to welding site during the welding process and is not stationary on the base metal surface. Therefore, a different technique must be used to identify each welding site which does not use the ferrule location as welding site location.

Another consideration in the design of a welding apparatus using a reusable ferrule is the area of the ground welding site. A ground welding site which is too small to accommodate the diameter of the shank of the stud should not be used. Further, welding sites that have been placed too near each other will interfere with the placement of the ferrule positioning system between consecutive welds. Additionally, welding sites which are too close to the outside perimeter of the base metal tend not to produce good welds and should not be considered as a valid welding site.

Attempts to replace the expendable ferrule with a reusable ferrule (and along with a synergistic positioning mechanism) have been previously disclosed in the art and have only been partially successful in disclosing a welding apparatus incorporating a reusable ferrule for arc welding applications.

For example, U.S. Pat. No. 5,049,717 (September 1991) issued to Mikihiko Yoshida and Hiroski Yamada teaches a ferrule construction having two semi-cylindrical arc shields (semi-cylindrical and identical ferrule sections) which have been constructively configured to include a lug on the inside cylindrical surface. A metallic clamp having an inner and outer member grip the inside and outside surface of each arc shield lug and fixes each arc shield to their respective support members. The support members and respective semicylindrical arc shields are subsequently each attached to a rotatable lever. The two support members are joined via links and are manually activated by a handle joined to a rotatable lever to mechanically force the arc shields together and around the shank of the stud before the welding process begins. The support members along with their respective links and the manually rotatable lever in combination positions and closes the two arc shields around the shank of the stud to form a cylindrically shaped ferrule.

The welding apparatus described above still requires the operator to manually open and close the two semicylindrical arc shields before and after the welding process by rotatably raising and lowering the lever. This is awkward when the operator is attempting to hold the welding apparatus (gun) with one hand while operating the lever to close the ferrule halves and then again to open the ferrule halves after the welding process has completed. Also, completely autonomous robotic welders should not require human intervention and should be configured to automatically position the ferrule around the shank of the stud and automatically close and open the ferrule sections.

Yoshida and Yamada also suggest that the metallic clamp construction and placement minimizes the thermal stresses placed on the ferrule by the molten metal. However, thermally induced stresses are still present because of the significant differences in the thermal coefficient of expansion between the ceramic material and the metallic clamp. It is also disclosed that a ceramic containing not less than 20% weight boron nitride is able to withstand the thermal shock experienced during the welding process.

U.S. Pat. No. 5,135,154 (August 1992), also issued to Mikihiko Yoshida and Hiroski Yamada, teaches a similar welding apparatus as disclosed in U.S. Pat. No. 5,049,717 but uses a ferrule with superior thermal shock resistance property. The ferrule composition disclosed in the U.S. Pat. No. 5,135,154 patent is composed of not less than 40 weight % of boron nitride (BN). The results of their study were published in their disclosure and is summarized in the following table. Only those ferrule compositions exceeding 100 welding cycles are listed.

| Ferrule Composition Table & Welding Cycles | | | | | | | |
|---|---|---|---|---|---|---|---|
| | Ferrule Composition | | | | | | Number of Welding |
| Ferrule ID | BN | AlN | $Si_3N_4$ | $Al_2O_3$ | $ZrO_2$ | CaO | $B_2O_3$ | Cycles |
| A | 99 | | | | | 0.5 | 0.5 | >100 |
| B | 96 | | | | | 1.5 | 2.5 | >100 |
| C | 80 | 20 | | TR | | TR | TR | >100 |
| D | 50 | 50 | | TR | | TR | TR | >100 |
| E | 80 | | 20 | | TR | TR | | >100 |
| F | 50 | | 50 | | | TR | TR | >100 |
| H | 60 | | | | 40 | TR | TR | >100 |

As indicated in the above table, ferrules constructed from boron nitride composites having a weight composition of 50% or more boron nitride successfully passed more than 100 welding cycles according to the Japanese Industrial Standard for arc welding test criteria (standard JIS B1198). Welding was conducted having 1,200-1,300 amps of welding current and an arc time of 800 msec.

For both of the above-mentioned patents, the welding sites are identified by the placement of the ferrule onto the base metal surface.

Boron nitride has a number of different grades depending upon the purity of the material and the binder type and includes pure boron nitride, boron nitride with a boric oxide binder system and boron nitride with a calcium binder system. Manufactures usually distinguish the different grades of boron nitride using their own symbology.

Solid boron nitride does not use any binder, is the purist form of boron nitride (>99%) and is recommended for extreme high-temperature and thermal shock applications and does not wet with most molten metals. However, it is a soft material and would not be a good candidate for reusable ferrule applications which experience mechanical stresses during the repeated positioning and closing cycles. Pure boron nitride is commonly referred to as hexagonal boron nitride [(h)BN], and has a maximum temperature of 2,000 degrees C. in inert environments.

Additionally, boron nitride may be combined with other materials to form composite ceramics with very distinct thermal, electrical, and mechanical properties. Boron nitride-based composites are usually also excellent electrical insulators making them a preferred choice for welding applications where large welding currents are utilized.

An example of a boron nitride composite which is an improvement over the composites listed in U.S. Pat. No. 5,135,154 is available from ESK Ceramics GmbH & Co. of Germany (now owned by 3M) and comprises a composite material of boron nitride, zirconium oxide and silicon carbide and is commonly referred to as ZSBN. This ceramic combines the non-wetting property of boron nitride with the refractoriness of zirconia and the high wear resistance of silicon carbide. The composite has the chemical symbol $BN-ZrO_2-SiC$ and is known under the tradename Mycrosint® SO. Other manufacturers such as Saint-Gobain Ceramics produce similar $BN-ZrO_2-SiC$ and other refractory ceramic composites.

The ZSBN ceramic also has good mechanical properties for stud welding applications having a Vickers hardness of 770 [HV0.5] and a Young's modulus of 80/35 [GPa].

Thermal properties include a thermal conductivity of 38/20 [W/mK] and a coefficient of thermal expansion of 3.5/8.5 [$10^{-6}$/K]. For Young's modulus, thermal conductivity and coefficient of expansion, the higher number refers to a measurement perpendicular to the ceramic manufacturing pressing direction. Additionally, this material may be first pressed into a starting shape and then easily machined into a final form using commonly used metal working processes such as milling and drilling operations using carbide tooling.

According to ESK Ceramics, $BN-ZrO_2-SiC$ has an application working temperature of 800 deg C. in air and 2,000 deg C. in inert atmospheres. Degradation of the $BN-ZrO_2-SiC$ ceramic usually is the result of surface oxidation of the material, and an inert working environment minimizes this failure mode.

Other binding systems are common which change the properties of boron nitride composites. For example, some manufacturers form a boron nitride composite having 40% boron nitride and 60% silicon dioxide ($SiO_2$) which has a maximum temperature of 1,000 degrees C. in inert environments.

For arc welding applications, the boron nitride prevents molten metal from wetting the ferrule surfaces during the welding process while additional materials such as zirconium and silicon carbide add mechanical strength and high wear resistance respectively to the ceramic composite. The BN—ZrO$_2$—SiC ceramic material has sufficient structural strength to withstand the mechanical forces for both the closing and opening of the semi-cylindrical ferrule section and also has the toughness required to withstand the repeated forceful downward contact with the base metal surface.

Thus there is a need for an arc welding apparatus having a collet and ferrule support assembly which easily and automatically positions a reusable ferrule around the shank of the stud and on top of the welding site, the reusable ferrule being able to further repeatedly withstand the high temperatures associated with the arc-welding process without degradation while maintaining sufficient mechanical strength to synergistically cooperate with the ferrule positioning mechanism during repeated welding cycles. The ferrule material should also be economically manufacturable and have good machining properties.

There is also a need for a welding apparatus which incorporates a reusable ferrule and which can further easily identify each welding site to determine if there is sufficient welding site area to accommodate the bottom shank area of the stud, and to further determine if the distance between welding sites is sufficient to accommodate the repeated movement of the collet and ferrule support assembly from one welding site to a subsequent welding site without positional interference, and to prevent the welding of a stud in predefined no-weld areas.

SUMMARY

The deficiencies of the prior art are overcome in the present invention which provides in a first embodiment a welding apparatus having a three axis (x-y-z) stud positioning system having x-axis, y-axis and z-axis linear motion systems which automatically positions a collet and ferrule support assembly (having a stud inserted into the collet) over the welding site prior to the beginning of the welding process.

The collet and ferrule support assembly includes a ferrule support plate, a collet support plate and a cross-member support plate arranged in a stacked configuration. All of the above-mentioned plates are vertically aligned with each other using four support rods as vertical guides. The lower end of each support rod is threaded and affixed to the ferrule support plate. The ferrule support plate is positioned closest to the base metal surface followed by the collet support plate and lastly by the cross-member support plate.

Pivotally attached to the ferrule support plate are two oppositely disposed slanted L shaped ferrule brackets. Each ferrule bracket includes a vertical arm attached to a downwardly and inwardly slanted arm (hence the designation "slanted"). The included angle between the vertical and slanted arm of each slanted L shaped ferrule bracket is greater than ninety degrees.

The free upper end of each vertical arm has a cylindrically shaped boss having a through hole for pivotally mounting each ferrule bracket to the ferrule support plate with a removable pin. The ferrule support plate is constructively configured having two pairs of formed tabs, each pair of tabs further having a horizontal through hole for accepting the removable pin. Alignment of the boss and tab holes along with the inserted pin pivotally supports each ferrule bracket. The removeable pins (one for each boss) allow the operator to quickly change the ferrule brackets during normal servicing of the welder.

The non-attached (free) end of each slanted arm includes a semi-cylindrical ferrule section.

The ferrule support plate is positioned around the collet and stud combination and does not interfere with the vertical motion of the collet and stud combination. Thus, each ferrule bracket may rotate around the pin and swing towards or away from each other. With the ferrule brackets swung completely towards each other, the semi-cylindrical ferrule sections of each ferrule bracket mate and close to form a cylindrically shaped ferrule around the shank of the stud.

Each ferrule bracket is composed of a refractory ceramic composite such as BN—ZrO$_2$—SiC ceramic.

Further connected to the upper end of the vertical arm of each ferrule bracket and located above the boss is one end of an extension spring having the other end of the extension spring attached to the ferrule support plate. Each spring biases their respective ferrule bracket to swing outward from the collet and stud combination and away from each other thereby opening the two semi-cylindrical ferrule sections without any other external forces.

Further attached to each vertical arm and below the boss of each ferrule bracket is a plunger of a solenoid. The body of the solenoid is attached to the ferrule support plate and is constructively configured to counter the force (when energized) of the extension spring. The solenoids are controlled by a computer, and when activated create a pulling force on the ferrule bracket.

When electrically energized, the solenoids force the two ferrule brackets to pivot towards each other. Thus, the closing of the brackets forms a complete cylindrically shaped ferrule which can be electrically controlled by activating the solenoid. With the solenoids deactivated, the brackets are forcibly opened and positioned away from each other by the force exerted by the extension springs. The shank of the stud passes through the center of the now formed closed cylindrically shaped ferrule during the welding process.

The solenoids could also be bi-directional capable of creating both a pulling and pushing force on the plunger. The extension springs would therefore not be required to separate the brackets.

Attached to the ferrule support plate are two limit switches for each ferrule bracket. The switches for each ferrule bracket are constructively configured to detect the opening and closing positional state for each ferrule bracket. Each of the four switches are in communication with the computer or a suitable input/output computer interface module (for example, a conventional peripheral component interconnect express, or PCIe, input and output card). Thus, the computer can query the switches and determine the opening and closing states of the ferrule brackets and therefore of the ferrule sections. The two switches for each ferrule bracket may be combined into a single switch (a conventional single pole double throw, or SPDT, switch for example) and housing.

A program is provided to control and synchronize the timing of the opening and closing of the ferrule brackets within the welding cycle.

Further affixed to the inside of a slanted arm of one ferrule bracket is a stud sensing transducer. The stud sensor transducer is in bi-directional communication with the computer via a conventional communication link and detects if a stud is inserted into the collet.

The collet support plate is located above the ferrule support plate and is spring-ably biased above the ferrule support plate with four compression springs concentric with the support rods. The springs are located between the top surface of the ferrule support plate and the bottom surface of the collet support plate. The collet support plate has a pressed bearing for each support rod. Thus, the collet support plate can spring-ably move in the z-direction with respect to the vertical position of the ferrule support plate.

A flange bearing pressed fitted an insulating sleeve of the collet support plate guides the vertical movement of a vertical collet support shaft. The lower end of the collet support shaft is attached to the top end of the collet, and the upper end of the collet support shaft extends above the top surface of the collet support plate.

A collet compression spring is disposed between the collet spring retaining ring mounted on the top of the collet and the bottom of the collet support plate. The z-direction travel of the collet support shaft is limited between the collet spring retaining ring and a collet retaining pin positioned through a horizontal hole located on the top end of the collet support shaft. The collet support plate is further affixed to a vertically positioned collet and ferrule assembly support bracket. The collet and ferrule assembly support bracket is attached to the z-axis motion system.

Thus, the downward vertical movement of the collet and ferrule assembly support bracket will cause the closed ferrule brackets to first spring-ably contact the base metal surface (by compressing the four springs located between the ferrule support and collet support plates) and then cause the stud to secondly spring-ably contact the base metal surface (by compressing the collet compression spring).

The cross-member support plate is positioned above the collet support plate and is adjustably affixed to the support rods. The vertical position of the cross-member support plate determines the vertical travel distance of, and amount of spring compression exerted on, the ferrule support plate by the four (support rod) compressions springs.

The concentrically aligned collet and stud combination is positioned over the welding site using a conventional computer-controlled servo-based robotic x-axis, y-axis and z-axis linear motion (rail) system as previously disclosed in U.S. Pat. No. 9,764,411, the contents of which are incorporated herewith as if set forth in full.

The x-axis positioning system includes two identical parallel linear motion systems disposed from each other and longitudinally positioned along the length of the surface of the base metal. The first x-axis linear motion system having a first and second saddle is driven by a brushless direct current (BLDC) motor-based servo system. The second x-axis linear motion system also includes a first and a second saddle. The saddles for the second x-axis linear motion system are not driven and are free to move along the x-axis of the second linear motion system.

The y-axis positioning system includes two identical parallel linear motion systems disposed from each other and laterally positioned across the width of the surface of the base metal. The first y-axis linear motion system having a first saddle is driven by a BLDC motor-based servo system. The second y-axis linear motion system also includes a first saddle. The saddle for the second y-axis linear motion system is not driven and is free to move along the y-axis of the second linear rail.

One end of the first y-axis linear motion system is connected to the first saddle of the first x-axis linear motion system, while the opposite end of the first y-axis linear motion system is connected to the first saddle of the second x-axis linear motion system. Similarly, one end of the second y-axis linear motion system is connected to the second saddle of the first x-axis linear motion system, while the opposite end of the second y-axis linear motion system is connected to the second saddle of the second x-axis linear motion system.

A support platform is positioned on top of the first and second y-axis linear motion systems and is attached to the first saddle of the first y-axis linear motion system and to the first saddle of the second y-axis linear motion system. Additional saddles may be used depending upon the vertical load.

The z-axis positioning system includes a single linear motion system positioned in the vertical direction and perpendicular to the base metal surface. The z-axis linear motion system is further attached to the support platform (mentioned previously) of the y-axis linear motion system. The z-axis linear motion system also includes a first and a second saddle and is similarly driven by a BLDC motor-based servo system. The first saddle of the z-axis linear motion system is positioned furthest from the base metal surface. Affixed to both z-axis saddles is the vertically positioned collet and ferrule assembly support bracket. An additional z-axis linear motion system may be added depending upon the vertical load and stability requirements.

Each x-axis, y-axis and z-axis servo system includes an axis controller and a BLDC servo motor having a feedback encoder. The driven linear motion systems may be included of a conventional ball and screw drive or belt drive which is connected to the driven axis saddles. Each axis controller is connected to and is in bi-directional communication with the computer.

Thus, the computer under software control can direct the x-axis and y-axis linear motion systems to move the collet and ferrule support assembly (along with the inserted stud) to a computed x-y position over the surface of the base metal. The computer under software control also controls the z-axis linear motion system to vertically move the collet and stud combination and ferrule brackets onto and off of the base metal surface. The x-y-z axis servo systems and computer includes an x-y-z stud positioning system and can position the stud at any location on the base metal surface.

Each of the driven x-axis, y-axis and z-axis linear motion systems additionally have two conventional limit switches positioned at the travel ends of the respective axis motion systems. The limit switches are in communication with and connected to the computer (or respective axis controller).

A conventional stud loader mechanism is provided which enables the stud welding positioning system to automatically load a stud into the collet during the welding process.

Located above the surface of the base metal is an imager having its imaging array parallel to the base metal surface. The imager is typically a conventional charge-coupled device (CCD) or complimentary metal oxide semiconductor (CMOS) camera having a lens optically focused to have a field of view (FOV) encompassing the entire surface of the base metal surface, welding sites and a registration marker located on the top surface of the base metal (embed) plate support structure. The imager is in communication with the computer via a universal serial bus (USB) or other communication channel. A light is also positioned above the base metal surface to illuminate the welding sites.

Connected to the support platform is a z-axis distance sensor to measure the vertical distance from the support platform (the support platform was previously described above) to the surface of the base metal. The distance sensor is in communication with the computer via a conventional communication link.

A welding control system is in bi-directional communication with, and is responsive to, the computer. The welding control system controls the actual welding process in response to a 'Weld' command from the computer. The welding control system also supplies the necessary welding current to generate both the pilot arc and welding arc.

Further connected to the computer is a conventional keyboard and liquid-crystal display (LCD). Using the keyboard and LCD, the operator may input and receive information from the computer.

The computer further incorporates programs to locate and identify valid welding sites by first identifying each potential ground welding site on the surface of the base metal using image threshold filtering and determining the center and radius of the maximum inscribed circle (MIC) contained within each identified welding site. The center of the maximum inscribed circle is used as a stud welding target location. The diameter of the maximum inscribed circle is used to ensure that sufficient ground welding site area is available for the weld and the distance between MIC centers is used to check for potential interference among nearest neighbor welding sites. Any welding sites having MIC areas less than the minimum required for welding are rejected. The computer also identifies and rejects any welding sites located within a predefined area around the perimeter of the base metal (such as an embed plate).

In operation, a base metal having pre-defined welding sites is placed underneath the x-y-z stud positioning system. In response to the operator pressing the 'Begin Welding' key on the keyboard, the computer first homes each axis, i.e., sets the location of the x-y-z axis at a known location (usually defined as [0,0,0] with respect to a conventional Cartesian coordinate system). It is assumed that the home position will not interfere with the imaging of the base metal surface.

The computer then sends a signal to the light to turn on which illuminates the base metal surface. The computer then commands the imager to image the base metal surface. The image data (image space data) is received by and subsequently stored in the memory of the computer.

The computer then inputs the raw image data, corrects the raw image for both lens and perspective distortions and stores the corrected image into computer memory. The computer also determines the image-space to object-space distance and area transformations and determines the image-space coordinates of a registration marker located on the top surface of the base metal (embed) plate support structure.

The computer then threshold filters the corrected image, removes salt and pepper and Gaussian noise, further processes the image to determine connected components (i.e., clusters of similar intensity valued pixels), and determines the area of all clusters and eliminates those clusters having an object-space area less than the minimum defined for welding a stud. The computer then further determines the area of the MIC and the center for each MIC and eliminates those clusters having an MIC area less than the minimum defined for welding a stud. These operations may be combined.

The computer then further calculates the center to center distances among all maximum inscribed circles and eliminates those maximum inscribed circles and associated clusters having distances less than the minimum distance required to weld the stud to prevent interference during the welding process (using the predetermined minimum spacing to accommodate the collet and ferrule support assembly with respect to previously welded studs), and then further eliminates those maximum inscribed circles and associated clusters intersecting a perimeter area defined by the operator to eliminate those clusters (and therefore welding sites) near the perimeter. The computer then creates a welding site coordinate table listing all the remaining MIC centers in both image-space and object-space.

The computer then controllably moves the collet and ferrule support assembly to the desired x-y-z location for loading a stud (for the first, and subsequent studs if any) and then checks the status of the stud loaded sensor. If the stud loaded sensor indicates that the stud is not loaded into the collet, the welding process stops, and the operator is notified. If a stud is loaded into the collet, the computer then controllably moves the ferrule and collet assembly to the x-y location specified in the welding site coordinate table.

The computer then controls the electrical activation of the solenoids and closes the ferrule brackets forming a cylindrical ferrule around the shank of the stud. The computer then checks the closed ferrule limit switches to ensure the ferrule sections have been closed. If the ferrule sections are not closed, the welding process stops, and the operator is notified.

If the ferrule sections are closed, the computer then reads the z-distance sensor and computes the necessary distance (offset corrected) to move the collet and ferrule support assembly. The computer then moves the collet and ferrule support assembly in a downward direction until the bottom of the ferrule sections engage the base metal surface.

At this position the four compression springs biasing the ferrule support plate in the vertical direction begin to compress increasing the contact force between the ferrule brackets and the base metal surface. The construction and arrangement of the ferrule brackets along with the downward force aids in the ferrule semi-cylindrical sections to forcibility close.

Downward motion continues until the bottom of the shank of the stud contacts the base metal surface thereby compressing the collet spring and increasing the contact force between the bottom of the shank and the base metal surface. The downward distances are calculated knowing the vertical lengths of the mechanical components, required offsets including the length of the stud, the z-axis sensor output, the desired amount of spring compressions and other factors.

At this position the ferrule sections are forcibly mated and closed around the shank and are forcibly contacting the base metal surface. The bottom of the shank of the stud is also forcibly contacting the base metal surface at the welding site target. The computer then opens the argon gas valve flooding the closed ferrule volume with argon gas.

At this point the computer then sends a 'Weld' signal to the welding control system. In response to the 'Weld' command from the computer, the welding control system first generates a pilot arc and shortly thereafter generates the welding arc. The high temperature welding arc then begins to melt both the end of the shank and the base metal forming a molten pool of material between the end of the shank and the top or the base metal surface.

After a predetermined time, the computer commands the z-axis controller to lift the stud a predetermined distance, dwell in this position for a predetermined time and then commands the z-axis controller to reverse direction of the stud thereby plunging the stud into the molten pool of material. Thereafter the welding control system removes the arc producing current and the weld is complete. The welding control system may send a 'Weld Complete' message back to the computer or the computer may time out after the 'Weld' signal is sent to the welding control system.

The computer then closes the argon gas valve.

The computer then commands the z-axis controller to lift the ferrule brackets off the base metal surface. A short distance above the base metal surface the computer de-energizes the solenoids and the two semi-cylindrical ferrule sections separate. The computer then checks the status of the open ferrule section limit switches. If the ferrule sections are not open, the welding process stops, and the operator is notified.

If the ferrule sections are open, z-axis controller continues to move the collet and ferrule support assembly vertically until reaching the z-home position. The computer then determines if there are any additional welding sites listed in the welding site coordinate table. If there are more available welding sites, the computer begins another welding cycle by controllably moving the collet and ferrule assembly to the desired x-y location for loading a stud.

A stud is then loaded into the collet and the entire cycle is then repeated for the remaining welding sites contained in the welding site coordinate table.

After the last stud has been welded and ferrule sections separated, the computer commands the x-axis, y-axis and z-axis servo controllers to move the collet and ferrule support assembly to the previously defined home position. The computer then shuts off the lights and awaits another operator command.

A system for automatically identifying one or more welding site locations on a surface of a target metal marked with a plurality of welding site candidates is provided. The system includes: an imager configured to acquire an image of the surface of the target metal including the plurality of welding site candidates, wherein the acquired image includes a plurality of pixels with each pixel having a corresponding intensity value; and a processing circuit configured to: receive the acquired image, compare each intensity value to an intensity threshold for pixel clustering, identify a plurality of pixel clusters, each pixel cluster corresponding to a different one of the plurality of welding site candidates, wherein each pixel cluster is a cluster of contiguous pixels that have intensity values that are equal to or greater than the intensity threshold, for each pixel cluster, determine whether a total pixel area making up the pixel cluster is less than a threshold pixel area, and remove any pixel cluster from consideration as a welding site location if the total pixel area of the pixel cluster is less than the threshold pixel area.

A system for automatically verifying a welding site location on a surface of a target metal marked with a welding site candidate is provided. The system includes: an imager configured to acquire an image of the surface of the target metal including the welding site candidate, wherein the acquired image includes a plurality of pixels with each pixel having a corresponding intensity value; and a processing circuit configured to: receive the acquired image, compare each intensity value to an intensity threshold for pixel clustering, identify a pixel cluster corresponding to the welding site candidate, wherein the pixel cluster is a set of contiguous pixels that have intensity values that are equal to or greater than the intensity threshold, determine whether a total pixel area making up the pixel cluster is less than a threshold pixel area, remove the pixel cluster from consideration as the welding site location if the total pixel area of the pixel cluster is less than the threshold pixel area, and verify the pixel cluster as the welding site location on a condition that the total pixel area of the pixel cluster is equal to or greater than the threshold pixel area.

A system for automatically verifying a welding site location on a surface of a target metal marked with a welding site candidate is provided. The system includes: an imager configured to acquire an image of the surface of the target metal including the welding site candidate, wherein the acquired image includes a plurality of pixels with each pixel having a corresponding intensity value; and a processing circuit configured to:

receive the acquired image, compare each intensity value to an intensity threshold for pixel clustering, identify a pixel cluster corresponding to the welding site candidate, wherein the pixel cluster is a set of contiguous pixels that have intensity values that are equal to or greater than the intensity threshold, determine a largest inscribed circle that is enclosed within the pixel cluster, compare a diameter of the largest inscribed circle with a threshold diameter corresponding to a dimension of a metal stud, remove the pixel cluster from consideration as the welding site location if the diameter of the largest inscribed circle is less than the threshold diameter, and verify the pixel cluster as the welding site location on a condition that the diameter of the largest inscribed circle is equal to or greater than the threshold diameter.

A system for automatically verifying a welding site location on a surface of a target metal marked with a welding site candidate is provided. The system includes: an imager configured to acquire an image of the surface of the target metal including the welding site candidate, wherein the acquired image includes a plurality of pixels with each pixel having a corresponding intensity value; and a processing circuit configured to: receive the acquired image, compare each intensity value to an intensity threshold for pixel clustering, identify a pixel cluster corresponding to the welding site candidate, wherein the pixel cluster is a set of contiguous pixels that have intensity values that are equal to or greater than the intensity threshold, determine a largest inscribed circle that is enclosed within the pixel cluster, determine a center of the largest inscribed circle, calculate a center-to-center distance to centers of other pixel clusters, remove the pixel cluster from consideration as the welding site location if the center-to-center distance to another pixel cluster is less than a distance threshold, and verifying the pixel cluster as the welding site location on a condition that the center-to-center distance to the centers of the each of the other pixel clusters is equal to or greater than the distance threshold.

A method for automatically verifying a welding site location on a surface of a target metal marked with a welding site candidate is provided. The system includes: acquiring an image of the surface of the target metal including the welding site candidate, wherein the acquired image includes a plurality of pixels with each pixel having a corresponding intensity value; comparing each intensity value to an intensity threshold for pixel clustering; identifying a pixel cluster corresponding to the welding site candidate, wherein the pixel cluster is a set of contiguous pixels that have intensity values that are equal to or greater than the intensity threshold; determining a largest inscribed circle that is enclosed within the pixel cluster; comparing a diameter of the largest inscribed circle with a threshold diameter corresponding to a dimension of a metal stud; removing the pixel cluster from consideration as the welding site location if the diameter of the largest inscribed circle is less than the threshold diameter; and verifying the pixel cluster as the welding site location on a condition that the diameter of the largest inscribed circle is equal to or greater than the threshold diameter.

Objects

To overcome the shortcomings of current arc welding technologies, a new apparatus and method for arc welding studs are provided.

A basic object of the invention is to provide an improved robotic stud welding apparatus for automatically welding studs at randomly placed ground welding sites on a base metal surface.

Another basic object of the invention is to provide an improved robotic stud welding apparatus for automatically welding studs at randomly placed ground welding sites on a base metal surface using a re-useable ferrule.

Another basic object of the invention is to provide an improved robotic stud welding apparatus for automatically welding studs at randomly placed ground welding sites on a base metal surface using a re-useable ferrule comprising two semi-cylindrical ferrule sections.

Yet still another basic object of the invention is to provide a re-useable ferrule composed of ceramic materials.

Another object of the invention is to provide a reusable ferrule composed of refractory ceramic materials.

Another object of the invention is to provide a reusable ferrule comprised of boron nitride (BN) based refractory material.

Another object of the invention is to provide a reusable ferrule comprised of a boron nitride based composite ceramic refractory material.

Another object of the invention is to provide a reusable ferrule comprised of an ultra-high-temperature ceramic (UHTC) material.

Another object of the invention is to provide a reusable ferrule composed of boron nitride, zirconium oxide, silicon carbide (BN—$ZrO_2$—SiC) based refractory material.

Another object of the invention is to provide a reusable ferrule composed of boron nitride, zirconium oxide, silicon carbide (BN—$ZrO_2$—SiC) based refractory material having heat dissipating fins.

Another object of the invention is to provide a reusable ferrule assembly composed of boron nitride, zirconium oxide, silicon carbide (BN—$ZrO_2$—SiC) based refractory material and the like and having heat dissipating fins.

Another object of the invention is to provide a reusable ferrule assembly composed of boron nitride, zirconium oxide, silicon carbide (BN—$ZrO_2$—SiC) based refractory material and the like and having integral heat dissipating fins.

Another object of the invention is to provide a reusable ferrule assembly composed of boron nitride, zirconium oxide, silicon carbide (BN—$ZrO_2$—SiC) based refractory material and the like and having a current of air flowing over the integral heat dissipating fins.

Another object of the invention is to provide a reusable ferrule assembly composed of boron nitride, zirconium oxide, silicon carbide (BN—$ZrO_2$—SiC) based refractory material and the like and having a controlled current of air flowing over the integral heat dissipating fins.

Another object of the invention is to provide a reusable ferrule assembly composed of a refractory material and the like and having a source of inert gas being supplied to the welding site and refractory material.

Another object of the invention is to provide a reusable ferrule assembly composed of a refractory material and the like and having a source of inert gas being controllably supplied to the welding site and refractory material.

Another object of the invention is to provide a robotic stud welder which automatically images the base metal.

Another object of the invention is to provide a robotic stud welder which automatically images the surface of a base metal.

Another object of the invention is to provide a robotic stud welder which automatically images the welding surface of a base metal.

Another object of the invention is to provide a robotic stud welder which automatically images welding sites.

Another object of the invention is to provide a robotic stud welder which automatically images welding sites located on the surface of a base metal.

Another object of the invention is to provide a robotic stud welder which automatically images welding sites located on the welding surface of a base metal.

Another object of the invention is to provide a robotic stud welder which automatically images ground welding sites.

Another object of the invention is to provide a robotic stud welder which automatically images the ground welding sites located on the surface of a base metal.

Another object of the invention is to provide a robotic stud welder which automatically images the ground welding sites located on the welding surface of a base metal.

Another object of the invention is to provide a robotic stud welder which automatically identifies welding sites.

Another object of the invention is to provide a robotic stud welder which automatically identifies welding sites located on the surface of the base metal.

Another object of the invention is to provide a robotic stud welder which automatically identifies welding sites located on the welding surface of the base metal.

Another object of the invention is to provide a robotic stud welder which automatically identifies ground welding sites.

Another object of the invention is to provide a robotic stud welder which automatically identifies ground welding sites located on the surface of the base metal.

Another object of the invention is to provide a robotic stud welder which automatically identifies ground welding sites located on the welding surface of the base metal.

Another object of the invention is to provide a robotic stud welder which automatically identifies welding sites from an image of the surface of a base metal.

Another object of the invention is to provide a robotic stud welder which automatically identifies welding sites located on the surface of the base metal from an image of the surface of a base metal.

Another object of the invention is to provide a robotic stud welder which automatically identifies welding sites located on the welding surface of the base metal from an image of the surface of a base metal.

Yet another object of the invention is to provide a robotic stud welder which automatically identifies welding sites which are in close proximity to the perimeter of an embed plate Another object of the invention is to provide a robotic stud welder which automatically identifies ground welding sites from an image of the surface of a base metal.

Another object of the invention is to provide a robotic stud welder which automatically identifies ground welding sites located on the surface of the base metal from an image of the surface of a base metal.

Another object of the invention is to provide a robotic stud welder which automatically identifies ground welding sites located on the welding surface of the base metal from an image of the surface of a base metal.

Yet another object of the invention is to provide a robotic stud welder which automatically identifies welding sites which are in close proximity to the perimeter of an embed plate.

Another object of the invention is to provide a robotic stud welder which automatically classifies the welding sites which are in close proximity to the perimeter of an embed plate.

Another object of the invention is to provide a robotic stud welder which automatically classifies the identified ground welding sites.

Another object of the invention is to provide a robotic stud welder which automatically classifies ground welding sites according to the area of identified ground welding site.

Another object of the invention is to provide a robotic stud welder which automatically classifies the identified ground welding sites into categories.

Another object of the invention is to provide a robotic stud welder which automatically classifies the identified ground welding sites into a first category or a second category.

Another object of the invention is to provide a robotic stud welder which automatically classifies the identified ground welding sites into a first category or a second category based upon the area of the identified ground welding sites.

Another object of the invention is to provide a robotic stud welder which automatically determines connected welding site pixels in the image.

Another object of the invention is to provide a robotic stud welder which automatically determines connected welding site pixels in the image.

Another object of the invention is to provide a robotic stud welder which automatically determines connected welding site pixels and forms clusters of connected welding site pixels.

Another object of the invention is to provide a robotic stud welder which automatically labels the clusters of welding site connected pixels.

Another object of the invention is to provide a robotic stud welder which automatically classifies the labelled clusters of ground welding sites into a first category or a second category, the first category based upon the area of the labelled clusters of ground welding sites equal to or greater than a predetermined area and the second category based upon the area of the labelled clusters of ground welding sites less than a predetermined area.

Another object of the invention is to provide a robotic stud welder which automatically classifies the labelled clusters of ground welding sites into a first category or a second category, the first category based upon the area of the labelled clusters of ground welding sites equal to or greater than a predetermined area and the second category based upon the area of the labelled clusters of ground welding sites less than a predetermined area, whereas the predetermined area is the minimum acceptable area to weld a stud.

Another object of the invention is to provide a robotic stud welder which automatically classifies the labelled ground welding sites into a first category or a second category, the first category based upon the area of the labelled ground welding site equal to or greater than a predetermined area and the second category based upon the area of the labelled ground welding site less than a predetermined area, whereas the predetermined area is the minimum acceptable ground area to weld a stud.

Another object of the invention is to provide a robotic stud welder which automatically classifies the labelled ground welding sites into a first category or a second category, the first category based upon the area of the labelled ground welding site equal to or greater than a predetermined area and the second category based upon the area of the labelled ground welding site less than a predetermined area based upon the area of the ground welding sites, whereas the area of the labelled ground welding site is the area of an inscribed circle of the labelled ground welding site.

Another object of the invention is to provide a robotic stud welder which automatically classifies the labelled ground welding sites into a first category or a second category, the first category based upon the area of the labelled ground welding site equal to or greater than a predetermined area and the second category based upon the area of the labelled ground welding site less than a predetermined area based upon the area of the ground welding sites, whereas the area of the labelled ground welding site is the area of an maximum inscribed circle of the identified ground welding site.

Another object of the invention is to provide a robotic stud welder which automatically determines the center of the inscribed circle of the labelled welding sites in the first category.

Another object of the invention is to provide a robotic stud welder which automatically determines the center of the maximum inscribed circle of the labelled welding sites in the first category.

Another object of the invention is to provide a robotic stud welder which concentrically aligns a ferrule assembly automatically with the inscribed circle for the first category of ground welding sites.

Another object of the invention is to provide a robotic stud welder which concentrically aligns a ferrule assembly automatically with the maximum inscribed circle for the first category of ground welding sites.

Another object of the invention is to provide a robotic stud welder which concentrically aligns a re-useable ferrule assembly automatically with the inscribed circle for the first category of ground welding sites.

Another object of the invention is to provide a robotic stud welder which concentrically aligns a re-useable ferrule assembly automatically with the maximum inscribed circle for the first category of ground welding sites.

Another object of the invention is to provide a robotic stud welder which automatically determines the center of the inscribed circle of the identified welding sites in the first category.

Another object of the invention is to provide a robotic stud welder which automatically determines the center of the maximum inscribed circle of the identified welding sites in the first category.

Another object of the invention is to provide a robotic stud welder which concentrically aligns a ferrule assembly automatically with the inscribed circle of the first category of ground welding sites.

Another object of the invention is to provide a robotic stud welder which concentrically aligns a ferrule assembly automatically with the maximum inscribed circle of the first category of ground welding sites.

Another object of the invention is to provide a robotic stud welder which concentrically aligns a reusable ferrule assembly automatically with the inscribed circle of the first category of ground welding sites.

Another object of the invention is to provide a robotic stud welder which concentrically aligns a reusable ferrule assembly automatically with the maximum inscribed circle of the first category of ground welding sites.

Another object of the invention is to provide a robotic stud welder which welds a stud concentrically aligned with the maximum inscribed circle of the first category of ground welding sites.

Another object of the invention is to provide a robotic stud welder which welds a stud concentrically aligned with the maximum inscribed circle of the first category of ground welding sites using a ferrule.

Another object of the invention is to provide a robotic stud welder which welds a stud concentrically aligned with the largest inscribed circle of the first category of ground welding sites using a re-usable ferrule.

Another object of the invention is to provide a robotic stud welder which welds a stud onto the surface of the base metal, the stud concentrically aligned with the largest inscribed circle of the first category of ground welding sites using a re-useable ferrule.

Other objects and advantages of the present invention will become clearer following a review of the specification and drawing. It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 6A is a side view of the first ferrule bracket illustrating the stud sensor, the cylindrical shaped boss, the inert and cooling gas conduits and the semi-cylindrical ferrule section.

FIG. 6B is a front view of the first ferrule arm further illustrating the support gusset.

FIG. 16 illustrates the process flow from the raw image of the embed plate to a welding site coordinate table (which lists the valid welding site coordinates).

FIGS. 17A-17F is a flowchart illustrating the operation of the preferred embodiment of the invention.

DETAILED DESCRIPTION

Figure 1:
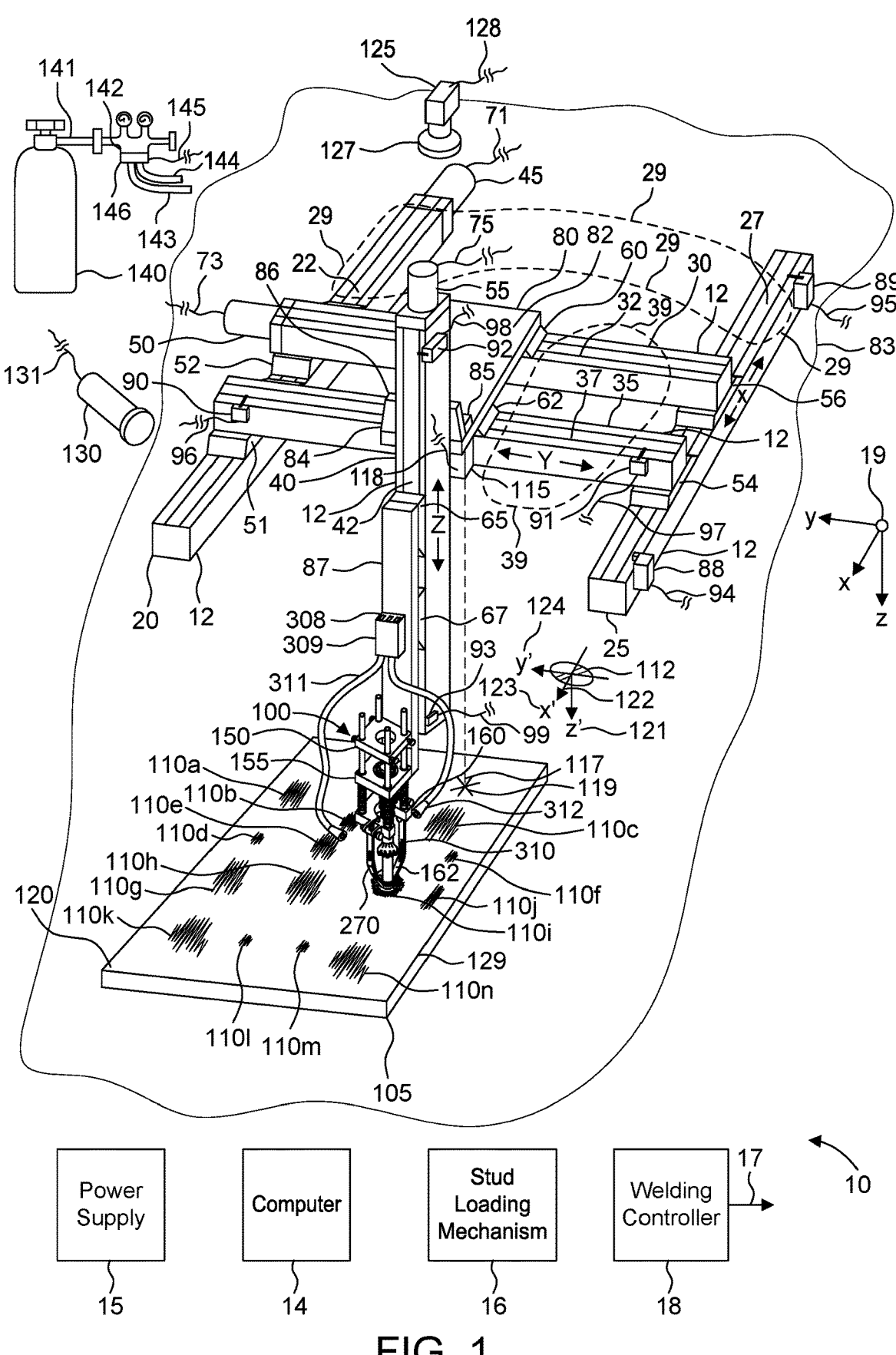
FIG. 1 is a perspective diagram of the present invention illustrating an improved robotic stud welding apparatus of the present invention comprising the x-y-z stud positioning system, the computer, power supply, stud loading mechanism and welding controller.

Referring now to the drawing in which like reference numbers refer to like elements throughout the various figures that comprise the drawing, FIG. 1 illustrates a first embodiment of the improved robotic stud welding apparatus 10 of the present invention and includes the x-y-z stud positioning system 12, the computer 14, the power supply 15, the stud loading mechanism 16, and the welding controller 18 having a conventional welding cable 17. The purpose of the improved robotic stud welding apparatus 10 is to weld a conventional steel stud 162 onto the top surface 120 of an embed plate 105 (or beam, girder, or the like) at randomly placed previously ground welding sites 110a through 110n such as ground welding site 110i using reusable ferrule brackets 270 and 310.

For the following disclosure, axes directions are defined by a conventional right-hand Cartesian coordinate system 19.

The improved robotic stud welding apparatus 10, and in particular the x-y-z stud positioning system 12, comprises a pair of parallel first and second x-axes positioning linear motion systems 20 and 25 respectively, a pair of parallel first and second y-axes positioning linear motion systems 30 and 35 respectively, and a single vertical z-axis linear motion system 40.

The top surfaces 22 and 27 of the x-axis positioning linear motion systems 20 and 25 respectively are planar coincident and form an x-axis linear motion systems surface plane 29 (partially shown and noted by an enclosed dashed line).

The top surfaces 32 and 37 of the y-axis linear motion systems 30 and 35 respectively are also planar coincident and form a y-axis linear motion systems surface plane 39 (partially shown and noted by an enclosed dashed line).

The x-axis linear motion systems surface plane 29 and the y-axis linear motion systems surface plane 39 are parallel and vertically (z-direction) displaced from each other, and the x-axis linear motion systems 20 and 25 are perpendicular to the y-axis linear motion systems 30 and 35 respectively.

The z-axis linear motion systems 40 has a top surface 42 and is vertically positioned and normal to both x-axis linear motion systems surface plane 29 and the y-axis linear motion systems surface plane 39. The x-axes, y-axes and z-axis linear motion systems are conventional in design and, for example, may include the models MF-K (Movoparts) ball guided screw driven linear systems manufactured by Thomson of Radford, Virginia, or the like.

The first x-axis linear motion system 20 is powered by a brushless DC motor 45, the first y-axis linear motion system 30 is powered by a brushless DC motor 50 and the z-axis linear motion system 40 is powered by a brushless DC motor 55. Other motor types such as a conventional brushed DC servo motor and the like may be used to power the linear motion systems.

The first x-axis linear motion system 20 has two separated and moveable first and second saddles 51 and 52 respectively. The saddles 51 and 52 are constrained to move along the top surface 22 of the linear motion system 20 in the x-direction (defined by the coordinate system 19) and are attached to, and powered with, a ball and screw drive not shown (or a belt drive or the like) connected to motor 45.

The second x-axis linear motion system 25 has two moveable first and second saddles 54 and 56 respectively similar to saddles 51 and 52. Saddles 54 and 56 are constrained to move along the top surface 27 in the x-direction of the linear motion system 25 and are not powered. Saddle 51 is positionally aligned in the y-direction with saddle 54 and saddle 52 is positionally aligned in the y-direction with saddle 56.

The first y-axis linear motion system 30 has a single moveable saddle 60. The saddle 60 is constrained to move along the top surface 32 of the linear motion system 30 in the y-direction defined by coordinate system 19 and is attached to, and powered with, a ball and screw drive not shown (or by a belt drive or the like) connected to motor 50.

The second y-axis linear motion system 35 has again a single moveable saddle 62 similar to saddle 60. Saddle 62 is constrained to move along the top surface 37 in the y-direction defined by coordinate system 19 of the linear motion system 35 and is not powered. Saddle 60 is positionally aligned in the x-direction with saddle 62. If necessary, the number of saddles for the y-axis linear motion systems 30 and 35 may be increased to support larger vertical loads.

The z-axis linear motion system 40 has two separated and moveable first and second saddles 65 and 67 respectively. Both saddles 65 and 67 are constrained to move along the top surface 42 of the z-axis linear motion system 40 and are attached to and powered by a ball and screw drive not shown (or by a belt drive or the like) connected to motor 55. The two saddles 65 and 67 are used to provide for increased vertical stability.

The x-axis linear motion systems 20 and 25 are affixed to the factory floor mount (not shown) or another stable fixture and positioned above the factory floor 83.

The first end of the first y-axis linear motion system 30 is affixed to saddle 52 and the second end of the first y-axis linear motion system 30 is affixed to saddle 56. The first end of the second y-axis linear motion system 35 is affixed to saddle 51 and the second end of the second y-axis linear motion system 35 is affixed to saddle 54.

A horizontal z-axis support plate 80 is conventionally affixed to the top surfaces of saddles 60 and 62. Further mounted to the top surface 82 of plate 80 is the horizontal leg 85 of an L-shaped bracket 84. The vertical leg 86 of the bracket 84 is further conventionally attached to z-axis linear motion system 40.

The first and second x-axis linear motion systems 20 and 25 respectively are fixed (both are attached to the floor mount) but the y-axis linear motion systems 30 and 35 may move in unison along the x-direction, while the z-axis axis linear motion system 40 may move along the y-direction. Thus, the z-axis linear motion system 40 may be positioned at a desired x-coordinate (by controlling the x-axis linear motion systems 20 and 25) and a desired y-coordinate (by controlling the y-axis linear motion systems 30 and 35), offset adjusted to accommodate the location of the Cartesian coordinate system 19.

Attached to z-axis linear motion system saddles 65 and 67 is the top end of vertically positioned collet and ferrule assembly support bracket 87. Attached to the bottom end and top surface of bracket 87 is collet and ferrule assembly 100. Further attached to the top surface of bracket 87 is a conventional blower 309 having a gas inlet port 308. Collet and ferrule assembly 100 is more fully described with reference to FIGS. 2-7.

Motors 45, 50 and 55 are electrically connected to motor controllers (not shown) via cables 71, 73 and 75 respectively. The motor controllers (not shown) connect to the computer 14 via cables and are more fully described below with reference to FIG. 8.

Motors 45, 50 and 55 each have a shaft encoder (not shown) which gives the angular position of the respective motor shafts and which may also be used to commutate the BLDC motors. This angular position data is transmitted back to the motor controllers 98 and can be accessed by computer 14 via busses (not shown).

Therefore, it is understood that the computer 14 can command x-y-z stud positioning system 12 to accurately position the collet and ferrule assembly 100 (along with the loaded stud 162) within the range of motion of system 12 (knowing of course the ball-screw or belt drive rotation to linear motion parameters, motor encoder transformations etc.).

Attached at the first and second ends of the x-axis linear motion system 25 are the first and the second conventional positional limit switches 88 and 89 respectively, and further attached at the first and the second ends of the y-axis linear motion system 35 are the first and the second conventional positional limit switches 90 and 91 respectively. Also attached at the first and the second ends of the z-axis linear motion system 40 are the first and the second conventional positional limit switches 92 and 93 respectively. Limit switches 88, 89, 90, 91, 92 and 93 are electrically connected to their respective axis brushless DC motor controllers (not shown) or the computer 14 via wires 94, 95, 96, 97, 98, 99 respectively. As used herein, the terms "wire," "cable" and "bus" refer to a communication system that transfers data between components inside a computer, or between a computer and device. This expression covers all related hardware components including, but not limited to, wire, optical fiber and the like, and software, including communication protocol.

The limit switches may alternately be placed on the complementary axis of the respective linear motion systems. For example, limit switches 88 and 89 may be attached to the first x-axis linear motion system 20 instead of the second x-axis linear motion system 25. The same is valid for the y-axes linear motion systems 30 and 35.

Shown below the x-axes, y-axes and z-axis linear motion systems is a conventional embed plate 105 having fourteen randomly located, surface ground welding sites 110a-110n. The welding sites 110a-110n have been previously manually ground and may therefore have different exposed metal surfaces areas. For example, ground site 110a has a larger ground area than ground site 110d. The ground sites are usually manually ground with a hand-held grinder or the like and usually do not have equal areas because of the manually grinding process. The welding sites may also be robotically ground.

The embed plate 105 is usually supported by an embed support structure (not shown for clarity) which is attached to the factory floor 83. Thus, the x-y-z stud positioning system 12 has a fixed geometric relationship for a given supported embed plate 105. On the top surface of the support structure is a registration marker 112 having a conventional right-handed Cartesian x'-y'-z' coordinate system 122. The coordinate system 122 has the x'-axis 123, the y' axis 124 and the z' axis 121. The coordinate system 122 may be translationally and rotationally displaced from coordinate system 19, although in most instances the x-y-z axes are parallel to the x'-y'-z' axes respectively (only a translation relationship exists between the coordinate systems 19 and 122 as shown in FIG. 1). Coordinate transformations between different Cartesian coordinate systems are well known in the art.

The planar top surface 120 of the embed plate 105 is oriented to be parallel to the x-axes linear motion system surface plane 29 (and therefore also to y-axes linear motion system surface plane 39), and is placed within the range of travel of the x-axes linear motion systems 20 and 25 and the y-axes linear motion systems 30 and 35, and is placed vertically below the x-y-z stud positioning system 12. Embed plate 105 is vertically supported by the embed support structure (not shown) which is attached to the factory floor 83.

Embed plate 105 is the workpiece and is not part of the x-y-z stud positioning system 12.

Further attached to the underside surface of z-axis support plate 80 is a z-axis directed laser-based distance sensor 115 having a vertically downward directed laser beam 117 which reflects off of the top surface 120 of the embed plate 105 at location 119. The sensor measures the distance from the support plate 80 to the top surface 120 of the embed plate 105 and is used to calculate z-direction distances. For example, the z location of the collet and ferrule support assembly 100 with respect to the surface 120 of the embed plate 105 can be determined using laser beam sensor (not shown) that is offset adjusted, the encoder data of the BLDC motor 55 and other parameters. The cable 118 provides communication to computer 14.

Located above the embed plate 105 is imager 125 having lens 127. The imager 125 has a field of view which fully covers the entire surface of any size embed plate 105 placed within the range of travel of the x-axes positioning linear motion systems 20 and 25 and the y-axes positioning linear motion systems 30 and 35.

It is assumed that the y-axes positioning linear motion systems 30 and 35 have been previously positioned (parked) along the x-axis so as not to obstruct the view when imager 125 is imaging the surface 120 of the embed plate 105. The parked location may also be the homed position for the x-y-z stud positioning system 12 so as not to obstruct the field of view of imager 125 of the embed plate 105. The homed position may be defined as the x-axes, y-axes, and z-axis travel extents for the respective linear motion systems.

Imager 125 particularly images ground welding sites 110a-110n located on the top surface 120 of the embed plate 105 as welding site candidates and simultaneously images the registration marker 112. The registration marker 112 is also registered with the (object space) x-y position of the x-axis and y-axis linear motion systems using conventional calibration methods. Thus, the registration marker has a known x-axis and y-axis position in both object-space and image-space.

Imager 125 is electrically connected to the computer 14 via the cable 128.

Also positioned above the embed plate 105 is an obliquely positioned electromagnetic wave source, also referred to herein as a light source 130 which illuminates the top surface 120 of embed plate 105. The light source 130 is fixed to an adjustable mount (not shown). The reflections of the light source 130 off the ground welding sites 110a-110n are imaged by imager 125.

The wavelength of light source 130 is not restricted and may include ultraviolet, visible, radio, x-ray and infrared wavelengths of electromagnetic radiation. The imager 125 is responsive to the wavelength of the light source 130.

The position of source 130 is manually adjusted to maximize the reflections of the light source 130 off the ground welding sites 110a-110n. Multiple light sources may be used to increase the intensity of the light reflections or to illuminate larger area embed plates. The light source 130 is connected to and controlled by the computer 14 via wire cable 131.

The imager 125 may be a complementary metal oxide semiconductor (CMOS) based area scan camera and the like having a high dynamic range such as model number acA1440-73gc like series manufactured by Basler AG of Germany.

Additionally, shown in FIG. 1 is the pressurized argon gas tank 140. The outlet port 141 of the gas tank 140 is connected to the inlet port of a conventional gas regulator 142. Gas regulator 142 regulates the flow of gas from the tank 140 through the electrically responsive gas valve 146 to the proximal ends of conduits 143 and 144. During normal operation the tank 140, gas regulator 142, electrically responsive gas valve 146 and conduits 143 and 144 are in fluid communication with each other. The other distal ends of the conduits 143 and 144 are attached to the ferrule brackets 270 and 310 respectively and are more fully discussed with reference to FIGS. 6 and 7. Electrically responsive gas valve 146 is electrically connected to the computer 14 via the cable 145.

The remaining features of FIG. 1 are discussed referring additionally now to FIGS. 2-7. Elements identified in FIGS. 1-7 that are discussed in the specification in relation to one figure, and which do not differ from corresponding elements in other figures, may not be discussed in the specification in connection with the subsequent FIGS. The collet and ferrule support assembly 100 comprises the conventional collet 156, the cross-member support plate 150, the collet support plate 155, the ferrule support plate 160, and a first and second ferrule brackets 270 and 310 respectively.

Collet and ferrule support assembly 100 is further attached to bracket 87 (dotted line representation) via collet support plate 155. As shown in FIGS. 1 and 2, a conventional steel stud 162 has been previously loaded into the collet 156 by the stud loading mechanism 16.

The conventional steel stud 162 comprises an upper cylindrical head 164 and a lower shank 166. The diameter of the head 164 is larger than the diameter of the shank 166 and is sized to be forcibly insertable into the lower section 158 of collet 156 and gripped by fingerlike grippers 159.

A flux pellet 168 (shown explicitly in FIGS. 2B and 2C) is attached to the bottom surface 170 of stud 162. Upon welding, the flux pellet 168 melts and quickly outgasses surrounding the area of the welding site with an oxidation preventative gas.

The collet 156 has formed an upper section 157 threadably affixed to the collet support shaft 210. The lower section 158 of collet 156 has formed expandable finger-like grippers 159 for gripping and forcibly holding the head 164 of the stud 162. Further formed on the upper section 157 of collet 156 is the collet spring retaining ring 169.

The upper end of shaft 210 has a through collet retaining pin 173 for limiting the downward vertical movement of the shaft 210 and therefore the collet 156.

Figure 3:
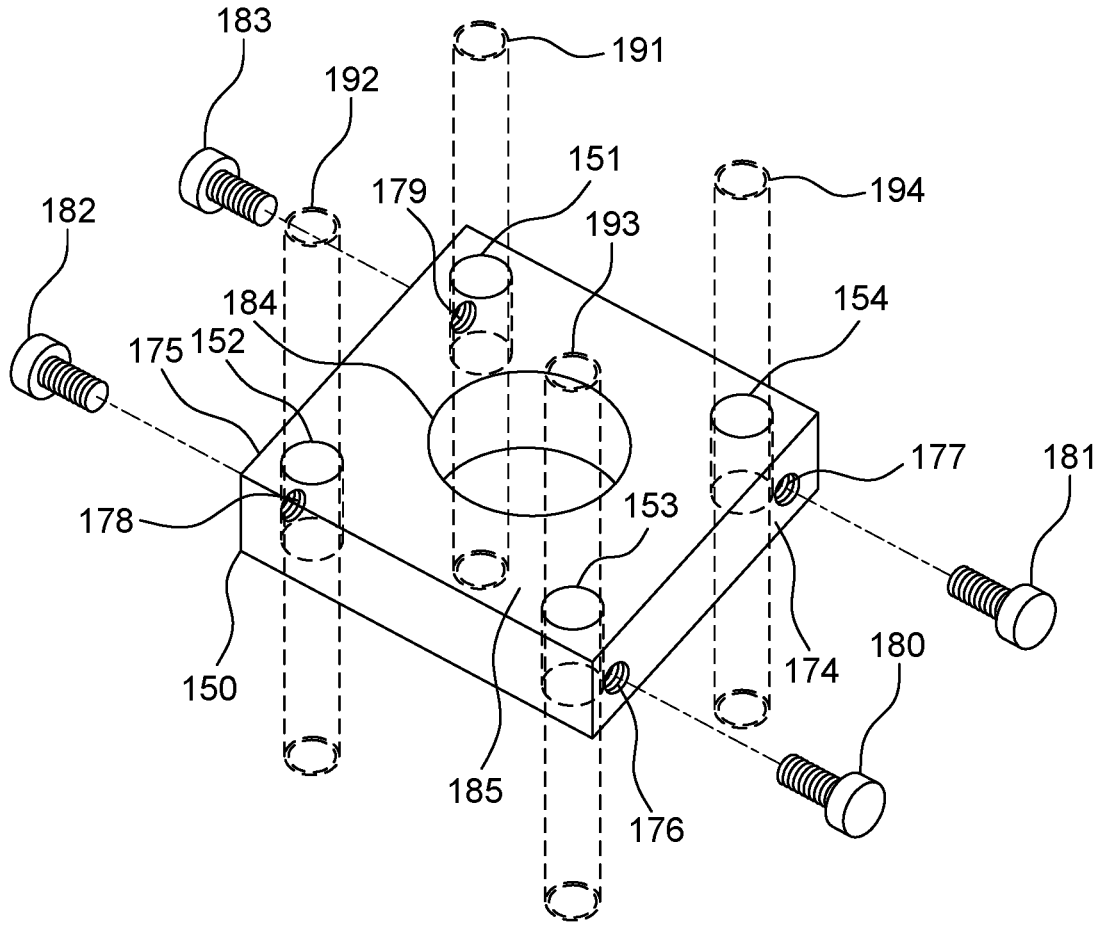
FIG. 3 is a perspective view of the cross-member support plate illustrating the four support rods and respective attachment bolts.

Referring particularly to FIG. 3, rectangular shaped cross-member support plate 150 comprises four corner positioned rod support through holes 151, 152, 153 and 154. The rod support through holes 151, 152, 153 and 154 are concentric with the support rods 191, 192, 193 and 194 (shown as dashed lines) respectively. The rod support through holes 151, 152, 153 and 154 also have a larger diameter than the rods 191, 192, 193 and 194 respectively which allows each rod to be slidably inserted through their respective hole.

The bottom ends of rods 191, 192, 193 and 194 are threaded and are more fully discussed with reference to FIG. 5.

The right-side wall 174 and oppositely disposed left-side wall 175 of rectangular support plate 150 each have two tapped holes 176 and 177, and 178 and 179, respectively. Threaded into each hole 176 and 177, and 178 and 179 are bolts 180 and 181, and 182 and 183, respectively. With rods 191, 192, 193 and 194 inserted into holes 151, 152, 153, and 154 respectively, tightening bolts 180, 181, 182 and 183 affixes each rod to plate 150. Thus, the vertical position of plate 150 can be slidably affixed with respect to the vertical position of rods 191, 192, 193 and 194.

The support plate further has a centrally located through hole 184 concentric with shaft 210. The diameter of hole 184 allows an obstructive passage of shaft 210 and pin 173. The plane of top surface 185 of plate 150 is parallel to plane 29 (and therefore also parallel to plane 39).

Figure 4:
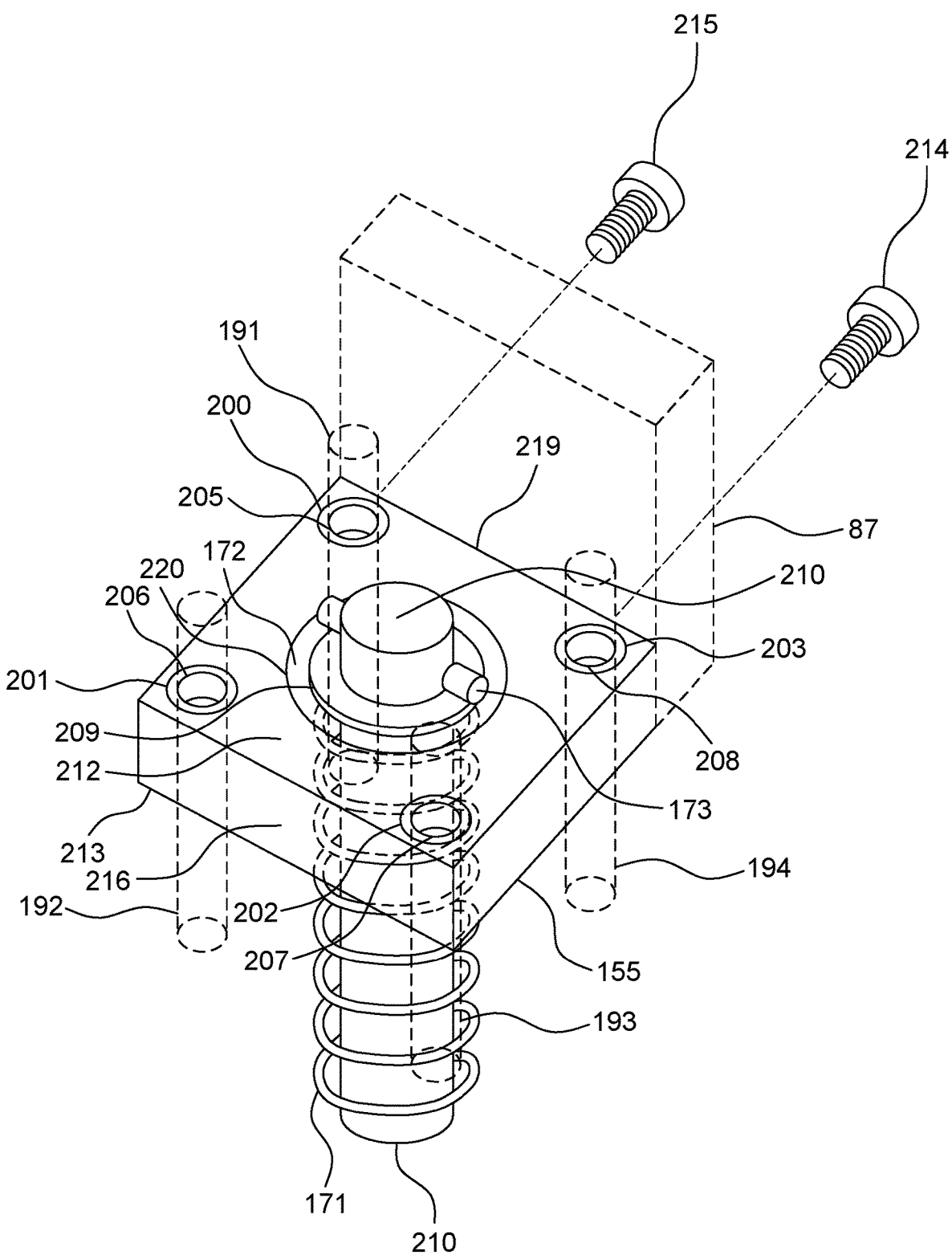
FIG. 4 is a perspective view of the collet support plate further illustrating the insulating bearing and flange bearing for supporting the collet support shaft.

Referring particularly to FIG. 4, the rectangular shaped collet support plate 155 has formed four corner-positioned through holes 200, 201, 202 and 203. Press fitted into the through holes 200, 201, 202 and 203 are bearings 205, 206, 207 and 208 respectively which supports rods 191, 192, 193 and 194 respectively. Bearings 205, 206, 207 and 208 may be conventional sleeve bearings or ball bearings or the like.

Thus, collet support plate 155 can move in a vertical (z-direction) positionally guided by the support rods 191, 192, 193 and 194. The top surface 212 and bottom surface 213 of plate 155 are parallel to plane 39.

Figure 2A:
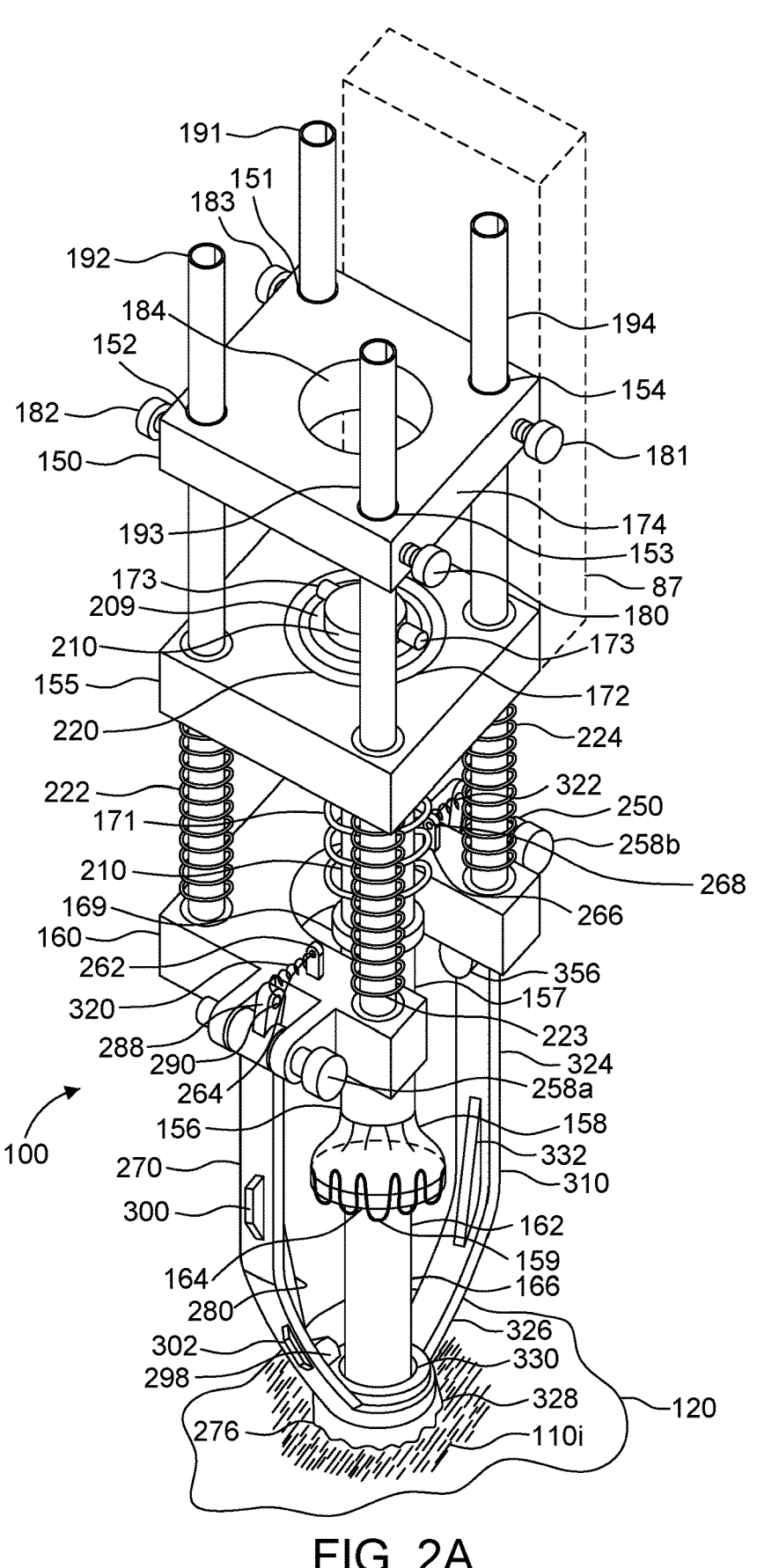
FIG. 2A is a perspective view of the collet and ferrule support assembly illustrating a pair of ferrule brackets enclosing the shank of a stud which has been loaded into the collet.
Figure 2B:
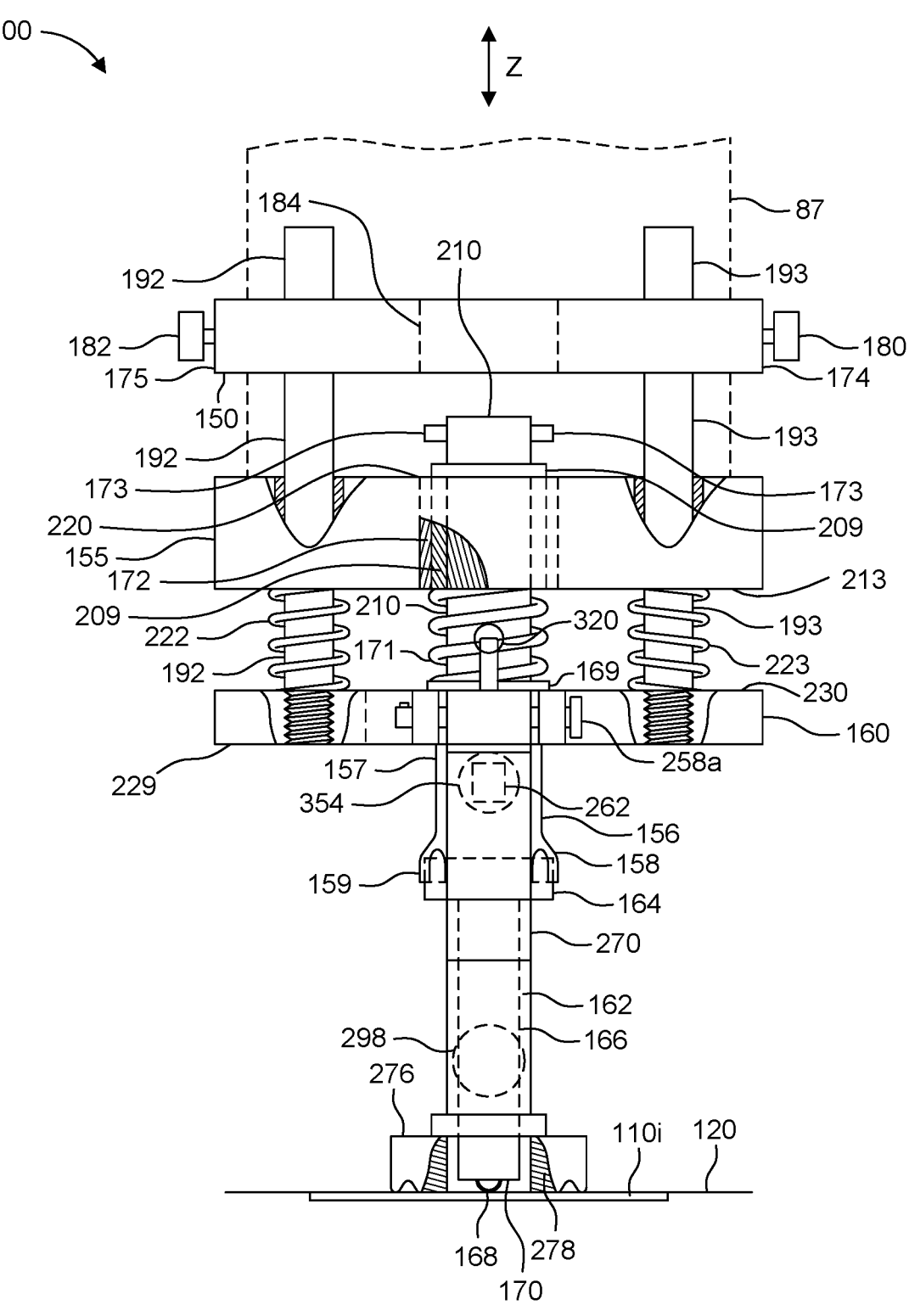
FIG. 2B is a front view of the collet and ferrule support assembly illustrating the pivotal attachment of the first ferrule bracket to the ferrule support plate.
Figure 2C:
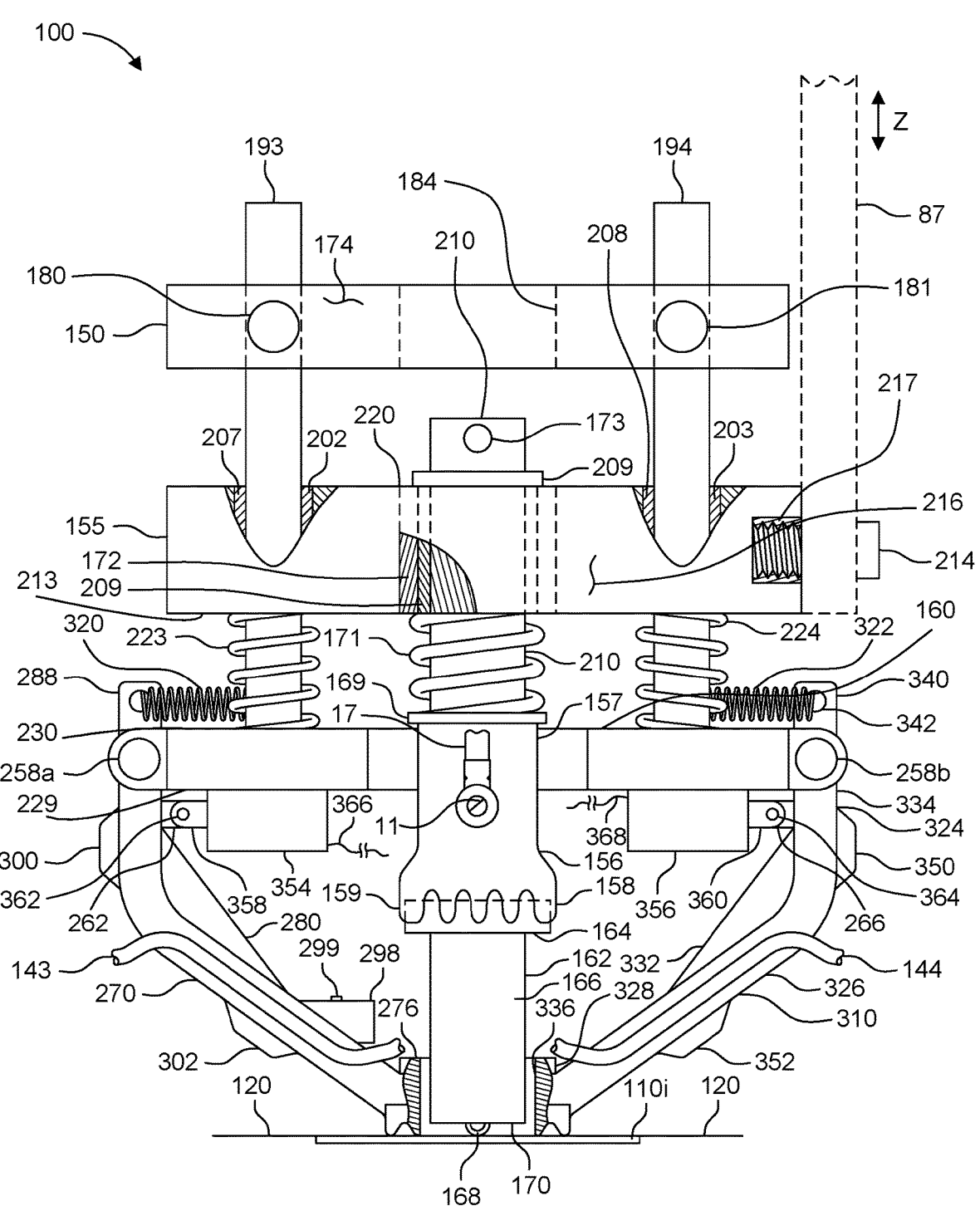
FIG. 2C is a side view of the collet and ferrule support assembly illustrating the solenoids for controlling the opening and closing of the pair of ferrule brackets, the stud sensor for sensing the presence of a loaded stud and the integral ferrule brackets cooling fins.

Collet support plate 155 is further attached to collet and ferrule assembly bracket 87 (shown in dotted lines) using bolts 214 and 215 which pass through respective holes in bracket 87 and thread into threaded holes 217 and 218 respectively (both not shown in FIG. 4, but hole 217 and bolt 214 are shown in FIG. 2C) positioned on the back side 219 (oppositely disposed from front surface 216) of plate 155. Collet support plate 155 therefore moves in the z-direction in response to the movement of bracket 87 within the range of motion of the z-axis linear motion system 40.

Collet support plate 155 has further formed a through hole 220. Press fitted into the through hole 220 is insulation bushing 172. Bushing 172 has further an inserted and press fitted flange bearing 209 to support shaft 210. Insulation bushing 172 electrically isolates the flange bearing 209 from plate 155, and therefore the stud 162, collet 156 and shaft 210 from collet support plate 155. The upper end of shaft 210 has a through collet retaining pin 173

Stud 162, collet 156, shaft 210, flange bearing 209 and insulating bushing 172 are concentric.

Referring to FIG. 2C, the collet spring 171 is disposed between the bottom surface of insulating bushing 172 and the top surface of collet spring retaining ring 169 and concentrically positioned around the shaft 210. The welding cable 17 is electrically and mechanically conventionally attached to the collet 156 using a bolt 11.

Figure 5:
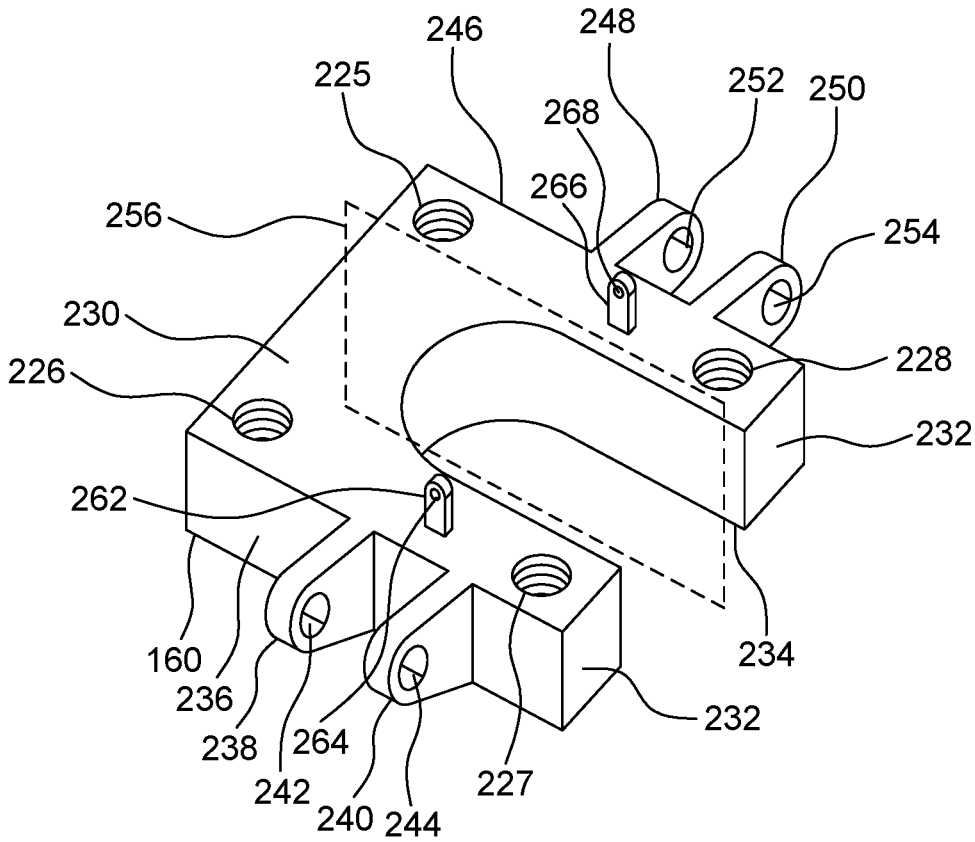
FIG. 5 is a perspective view of the ferrule support plate illustrating the ferrule brackets mounting tabs.

Referring specifically to FIGS. 5 and 2B, the substantially rectangular shaped ferrule support plate 160 has four corner-positioned threaded through holes 225, 226, 227 and 228 for accepting the threaded bottom ends of the support rods 191, 192, 193 and 194 respectively. When threaded into their respective holes, support rods 191, 192, 193 and 194 are perpendicular to the top surface 230 of plate 160 and are all aligned with the z-direction. The top surface 230 (and also the bottom surface 229) of plate 160 is parallel to plane 29 (and therefore also parallel to plane 39).

In the embodiment illustrated in FIG. 5, the right side 232 of ferrule support plate 160 has formed a one ended opened slot 234.

The front side 236 of the ferrule support plate 160 has formed the front side first ferrule mounting tab 238 and a front side second ferrule mounting tab 240 respectively, each tab having horizontally directed concentric through holes 242 and 244 having their respective axes parallel to the y-axis.

Similarly, the rear side 246 (disposed opposite of front side 236) of the ferrule support plate 160 has formed rear side first and second ferrule mounting tabs 248 and 250, each tab having horizontally directed concentric through holes 252 and 254 respectively and having their respective axes parallel to the y-axis. Tab pair 238 and 240 are mirrored about a plane 256 which is parallel to the front side 236, is directed along the y-axis direction and bisects the plate 160 in the x-axis direction to form tab pair 248 and 250.

Hole pair 242 and 244 and hole pair 252 and 254 are each sized accordingly to accept a conventional ring-grip quick release pin 258a and 258b (see FIGS. 2A and 2C) respectively or the like.

Figures 7A, 7B:
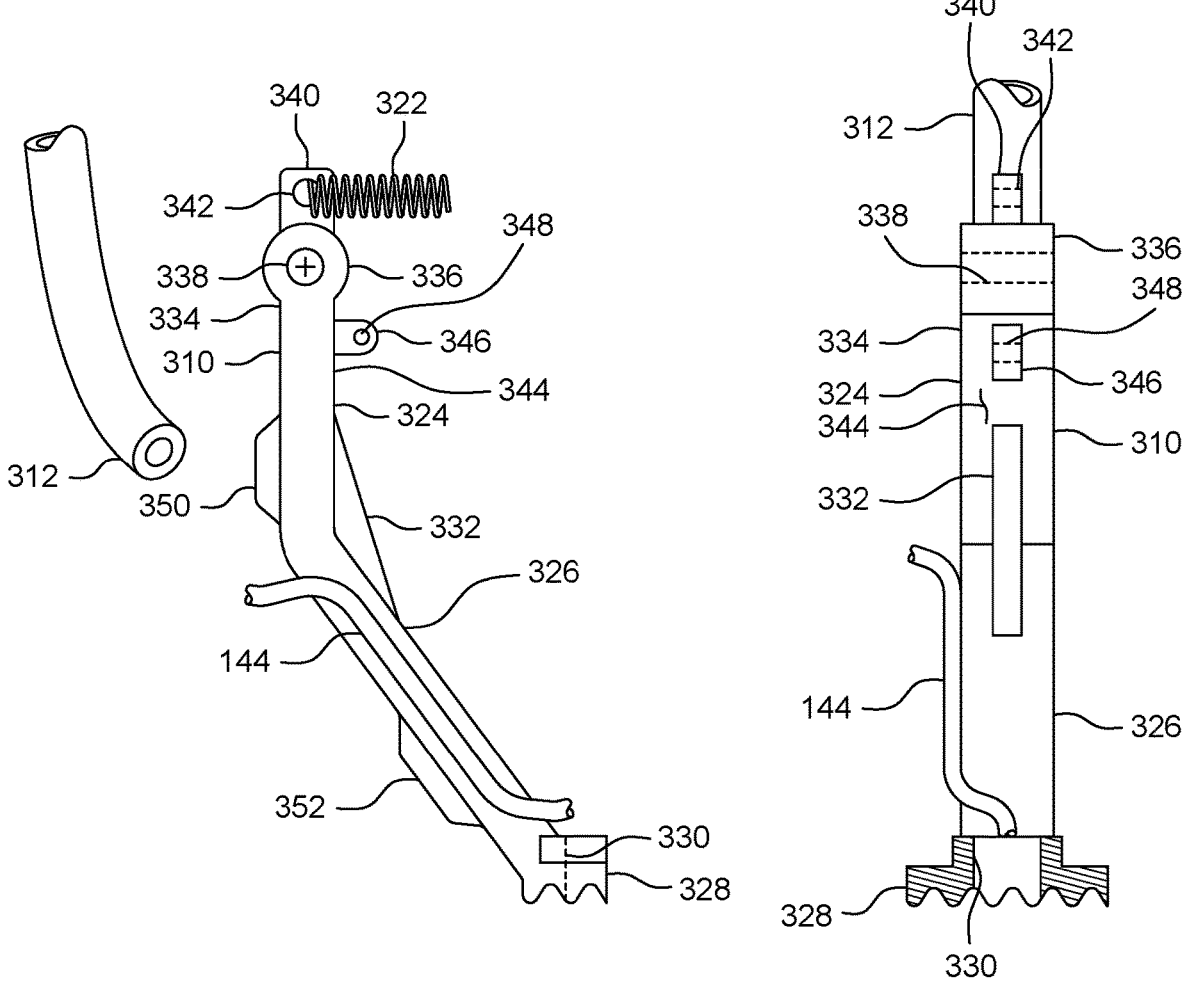
FIG. 7A is a side view of the second ferrule bracket illustrating the cylindrical shaped and the inert and cooling gas conduits and the semi-cylindrical ferrule section.
FIG. 7B is a front view of the second ferrule arm further illustrating the support gusset.

Referring specifically to FIGS. 2C, 6A and 7A, tabs 238 and 240, and tabs 248 and 250, are further constructively configured to mate with cylindrical shaped bosses 284 and 336 of the ferrule brackets 270 and 310, respectively.

The top surface 230 of ferrule support plate 160 further has formed a first ferrule bracket spring holding tab 262 having the through hole 264 whose axis is parallel to the x-axis. A second ferrule bracket spring holding tab 266 is mirrored through plane 256 having the through hole 268 whose axis is parallel to the x-axis. Holes 264 and 268 are concentrically aligned.

Referring specifically to FIGS. 1, 2A, 2B, and 2C, four compression springs 221 (not shown), 222, 223 and 224 are placed around and concentric with rods 191, 192, 193 and 194 respectively and disposed between the bottom surface 213 of plate 155 and the top surface 230 of ferrule support plate 160. Springs 221 (not shown), 222, 223 and 224 extend-ably bias the ferrule support plate 160 (and the ferrule brackets 270 and 310). As the bottom of the ferrule sections 276 and 328 of ferrule brackets 270 and 310 respectively contact the surface 120, springs 221-224 compress thus forcibly holding the ferrule brackets 270 and 310 against the surface 120.

Referring specifically to FIGS. 2A, 2B, and 2C, the collet spring 171 is disposed between the collet spring retaining ring 169 and the bottom surface of insulating bushing 172. Collet spring 171 extend-ably biases the collet 156 (and loaded stud 162). As the stud 162 comes into contact with surface 120, spring 171 begins to compress.

Referring now to FIGS. 6A and 6B, and FIGS. 7A and 7B, the first ferrule bracket 270 is shown having an upper vertical arm 272 and an inwardly slanting (i.e., towards the loaded stud 162) lower arm 274. Further formed on the lower section of lower arm 274 is a semi-cylindrical ferrule section 276 of a conventional ferrule. Ferrule section 276 further comprises a partial semi-cylindrical shaped through hole 278 having a diameter exceeding the diameter of stud shank 166.

As is discussed later in this disclosure, closing both ferrule brackets 270 and 310 will mate the ferrule section 276 of ferrule bracket 270 with the corresponding ferrule section 328 of ferrule bracket 310 thus forming a closed conventional ferrule around the shank of stud 162. Thus, shank 166 can freely move through the completed hole formed with the mated ferrule sections 276 and 328.

Gusset 280 is inwardly formed between the lower portion of the upper vertical arm 272 and the upward portion of lower arm 274. Gusset 280 provides additional strength to ferrule bracket 270, and may also dissipate heat generated in ferrule bracket 270 by the welding process.

Formed at the upper end 282 of the upper vertical arm 272 is a horizontally positioned cylindrically shaped boss 284 having a through hole 286. Through hole 286 is sized accordingly to freely accept a conventional ring-grip quick release pin 258a (see FIG. 2A) or the like. The axis of through hole 286 is parallel to the y-axis of the Cartesian coordinate system 19.

Also formed on the top surface of boss 284 is a vertical tab 288 having a through hole 290. Further formed on the top inward surface 292 of the upper vertical arm 272 is tab 294 having through hole 296. The axes of through holes 290 and 296 are parallel to the y-axis of the Cartesian coordinate system 19.

Further mounted on the inside surface of lower arm 274 is a conventional steel stud sensor 298 having a cable 299. Sensor 298 senses the presence of steel stud 162 and may incorporate optical or magnetic based sensing technologies, and communicates with computer 14 via stud sensor cable 299.

Further formed on the outside surfaces of ferrule bracket 270 are heat dissipating heatsink fins 300 and 302. The fins 300 and 302 are composed of the same material as the ferrule bracket 270 and will have the same coefficient of thermal expansion and will therefore minimize thermally induced internal stresses. Additional heatsinking fins may be added to the surfaces of ferrule bracket 270.

A conventional blower 309 (as shown in FIG. 1) or fan or other air moving device or the like may also be mounted on collet and ferrule assembly support bracket 87. Air or other gas (such as an inert gas such as argon) is forced into the inlet port 308 (see FIG. 1) of blower 309 and exists under pressure through the outlet conduits 311 and 312.

The current of gas from blower 309 via the conduit 311 is directed to flow across the surfaces of ferrule bracket 270 and especially the surfaces of heatsink fins 300 and 302 thereby dissipating any heat build-up produced in the ferrule bracket 270 by the arc welding process. The fins 300 and 302 are passive heat exchangers that transfer the heat generated in the ferrule bracket 270 by the arc welding process to the current of air flowing across the fins. The current of air may be replaced by a circulating fluid and the ferrule bracket 270 constructively configured to accommodate a liquid medium, or a combination of a current of air and fluid cooling could be used. The inert gas may also retard the surface oxidation of the ferrule bracket 270.

The support clamp for affixing the conduit 311 to the ferrule bracket 270 is not shown for clarity.

Also shown in FIGS. 6A and 6B is conduit 143. The distal end of conduit 143 is attached to the lower arm 274 of the ferrule bracket 270 in close proximity to the semi-cylindrical ferrule section 276. The distal end of conduit 143 is constructively configured to direct the argon gas flowing outwards from the distal end of conduit 143 into the volume bounded by the closed inside surfaces of the mated semi-cylindrical ferrule sections 276 and 328, the surface 120 of the embed plate 105 (see FIG. 1), and the shank 166 of the loaded stud 162 (see FIG. 2C).

The argon gas inhibits the oxidation of the closed inside surfaces of the semi-cylindrical ferrule sections 276 and 328 during the welding of stud 162 extending the useful life of the ferrule bracket 270 (and 310).

Referring to FIGS. 7A and 7B, the second ferrule bracket 310 is shown. The second ferrule bracket 310 is identical to the first ferrule bracket 270 except for the stud sensor 298 on first ferrule bracket 270.

The second ferrule bracket 310 has an upper vertical arm 324 and an inwardly slanting lower arm 326. Further formed on the lower section of lower arm 326 is a semi-cylindrical ferrule section 328 of a conventional ferrule. Ferrule section 328 further has formed a semi-cylindrical through hole 330 having a diameter exceeding the diameter of stud shank 166.

As previously mentioned, closing both the first and second ferrule brackets 270 and 310 mates the ferrule sections 276 and 328 respectively thus forming a conventional ferrule and allowing shank 166 to freely move through hole created by the mated ferrule sections 276 and 328.

Gusset 332 is inwardly formed between the lower portion of the upper vertical arm 324 and the upward portion of lower arm 326. Gusset 332 provides additional strength to ferrule bracket 310, and may also dissipate heat generated in ferrule bracket 310 by the welding process.

Formed at the upper end 334 of the upper vertical arm 324 is a horizontally positioned cylindrically shaped boss 336 having a through hole 338. Through hole 338 is sized accordingly to accept a conventional ring-grip quick release pin 258b (see FIG. 2A) or the like. The axis of the through hole 338 is parallel to the y-axis of Cartesian coordinate system 19.

Also formed on the top surface of boss 336 is a vertical tab 340 having a through hole 342. Further formed on the top inward surface 344 of the upper vertical arm 324 is tab 346 having through hole 348. The axes of the through holes 342 and 348 are parallel to the y-axis of Cartesian coordinate system 19.

Further formed on the outside surfaces of ferrule bracket 310 are heatsinking fins 350 and 352. The fins 350 and 352 are composed of the same material as the ferrule bracket 310 and will have the same coefficient of thermal expansion and will therefore minimize thermally induced internal stresses. Additional fins may be added to the surfaces of ferrule bracket 310.

The current of gas from conduit 312 is directed to flow across the surfaces of ferrule bracket 310 and especially the heatsink fins 350 and 352 via the conduit 312 thereby dissipating any heat build-up produced in the ferrule bracket 310 by the arc welding process. The heatsink fins 350 and 352 are passive heat exchangers that transfer the heat generated in the ferrule 310 by the arc welding process to the current of air. The current of air may be replaced by a circulating fluid and the ferrule 310 constructively configured to accommodate a liquid medium. The inert gas may also retard the surface oxidation of the ferrule bracket 310.

The support clamp for affixing the conduit 312 to the ferrule bracket 310 is not shown for clarity.

Also shown in FIGS. 7A and 7B is conduit 144. The distal end of conduit 144 is conventionally attached to the lower arm 326 of the ferrule bracket 310 in close proximity to the semi-cylindrical ferrule section 328. The distal end of conduit 144 is constructively configured to direct the gas flowing outwards from the distal end of conduit 144 into the volume bounded by the closed inside surfaces of the semi-cylindrical ferrule sections 276 and 328, the surface 120 of the embed plate 105 (see FIG. 1), and the shank 166 of the loaded stud 162 (see FIG. 2C).

Referring to FIGS. 6A and 6B, attached to the hole 290 of tab 288 of ferrule bracket 270 is one end of the extension spring 320, the other end of the extension spring 320 is attached to the hole 264 of tab 262 of plate 160 (see FIG. 2A). Likewise, referring to FIGS. 7A and 7B attached to the hole 342 of tab 340 of ferrule bracket 310 is one end of the extension spring 322, the other end of the extension spring 322 is attached to the hole 268 of tab 266 of plate 160 (see FIG. 2A).

Referring to FIG. 2C, mounted on the bottom surface 229 of plate 160 are solenoids 354 and 356 having moveable plungers 358 and 360 respectively. The distal ends of plungers 358 and 360 are conventionally connected to tabs 262 and 266 via pins 362 and 364 or by other means, respectively. Cables 366 and 368 connect solenoids 354 and 356 respectively to computer 14. When solenoids 354 and 356 are electrically energized, plunger 358 and 360 are forcibly pulled into the bodies of their respective solenoids.

As previously mentioned, the solenoids 354 and 356 may be configured to provide both a pulling and pushing force. If the solenoids 354 and 356 are configured to additionally provide a pushing force, then the extension springs 320 and 322 are not required with the force required to separate (open) the ferrule sections 276 and 328 being supplied by the solenoids 354 and 356 respectively.

Additionally, ferrule bracket 270 and ferrule bracket 310 each have a "ferrule section opened" and "ferrule section closed" conventional limit switches 370 and 371 respectively (not shown for clarity). The limit switches 324 and 371 are mounted on plate 160 and constructively configured to be responsive to the rotatable positions of the ferrule's brackets 270 and 310 respectively.

The ferrule brackets 270 and 310 are composed of a high temperature, electrically insulating, non-wetting and heat conducting refractory material such as $BN$—$ZrO_2$—$SiC$ based ceramic composite or the like, including ultra-high-temperature ceramics (UHTC), such as those currently under consideration for use in the construction of hyper-sonic missiles.

Figure 8:
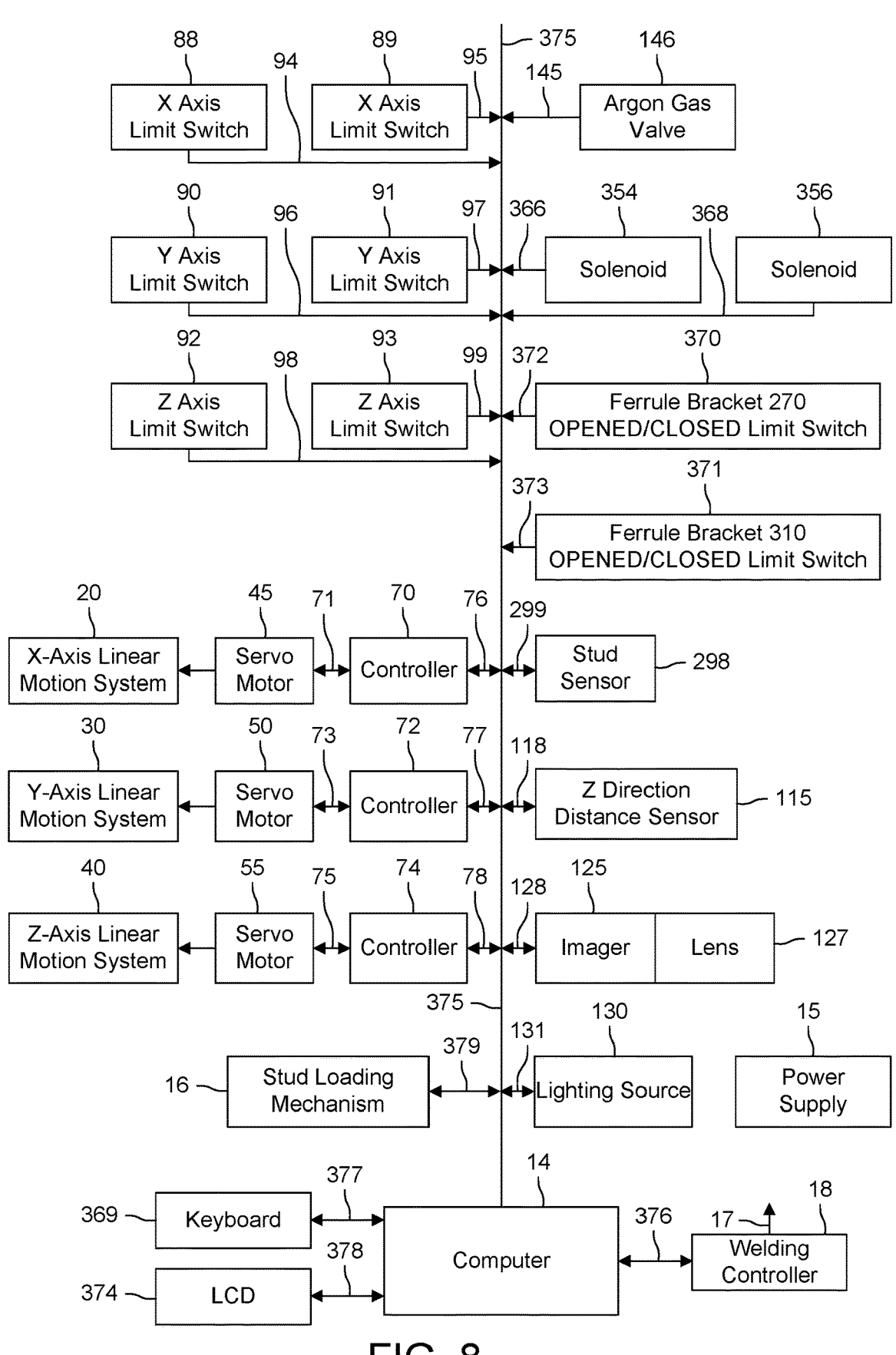
FIG. 8 is a block diagram of the preferred embodiment of the present invention.

Referring to FIG. 8, a block diagram of the improved robotic stud welding apparatus 10 of the present invention is shown and includes computer 14, power supply 15, stud loading mechanism 16, welding controller 18, conventional keyboard 369, conventional liquid crystal display (LCD) 374, light source 130, imager 125 having lens 127, z-direction distance sensor 115, stud sensor 298, x-axis positioning linear motion system 20, BLDC servo motor 45, BLDC motor 45, motion controller 70, y-axis positioning linear motion system 30, BLDC servo motor 50, BLDC motor 50 motion controller 72, z-axis linear motion system 40, BLDC servo motor 55, BLDC motor 55 motion controller 74, second x-axis linear motion system 25 first and second limit switches 88 and 89 respectively, second y-axis linear motion system 35 first and second limit switches 90 and 91 respectively, z-axis linear motion system 40 first and second limit switches 92 and 93 respectively, ferrule bracket 270 opened/closed limit switch 370, ferrule bracket 310 opened/closed limit switch 371, solenoid 354, solenoid 356, and argon gas valve 146.

The stud loading mechanism 16, welding controller 18, conventional keyboard 369, conventional liquid crystal display (LCD) 374, light source 130, imager 125, distance sensor 115, stud sensor 298, BLDC motor controller 70, BLDC motor controller 72, BLDC motor controller 74, x-axis linear motion system 25 first and second limit switches 88 and 89 respectively, y-axis linear motion system 35 first and second limit switches 90 and 91 respectively, z-axis linear motion system 40 first and second limit switches 92 and 93 respectively, solenoid 354, solenoid 356, ferrule bracket 270 opened/closed limit switch 370, ferrule bracket 310 opened/closed limit switch 371, and argon gas valve 146 are in bi-directional communication with computer 14 and each other via local buses 379, 376, 377, 378, 131, 128, 118, 299, 76, 77, 78, 94, 95, 96, 97, 98, 99, 366, 368, 372, 373, 145, respectively, and master bus 375.

Limit switches 370 and 371 each generate a signal when the ferrule sections 276 and 328 are fully closed (thereby signaling that a complete cylindrical ferrule is formed around and the shank 166) or fully opened (thereby signaling that the ferrule sections 276 and 328 are fully separated from the shank 166), respectively.

The limit switches 370 and 371 are connected to either a motor controller 70, 72 or 74 (using the available standard input and output (I/O) port of the controller) or to a conventional input/output port of computer 14 using cables 372 and 373 respectively. The state of the limit switches 370 and 371 can be communicated to the computer 14 through any of the motor controllers 70, 72 and 74, or directly to the input/output port of the computer 14.

The liquid crystal display 374 may include touch screen technology for entering data by the operator to the computer 14.

The stud loading mechanism 16 is of conventional design and is constructively configured to accommodate the x-y-z stud positioning system 12 for loading a stud 162 into the collet 156.

Figure 9:
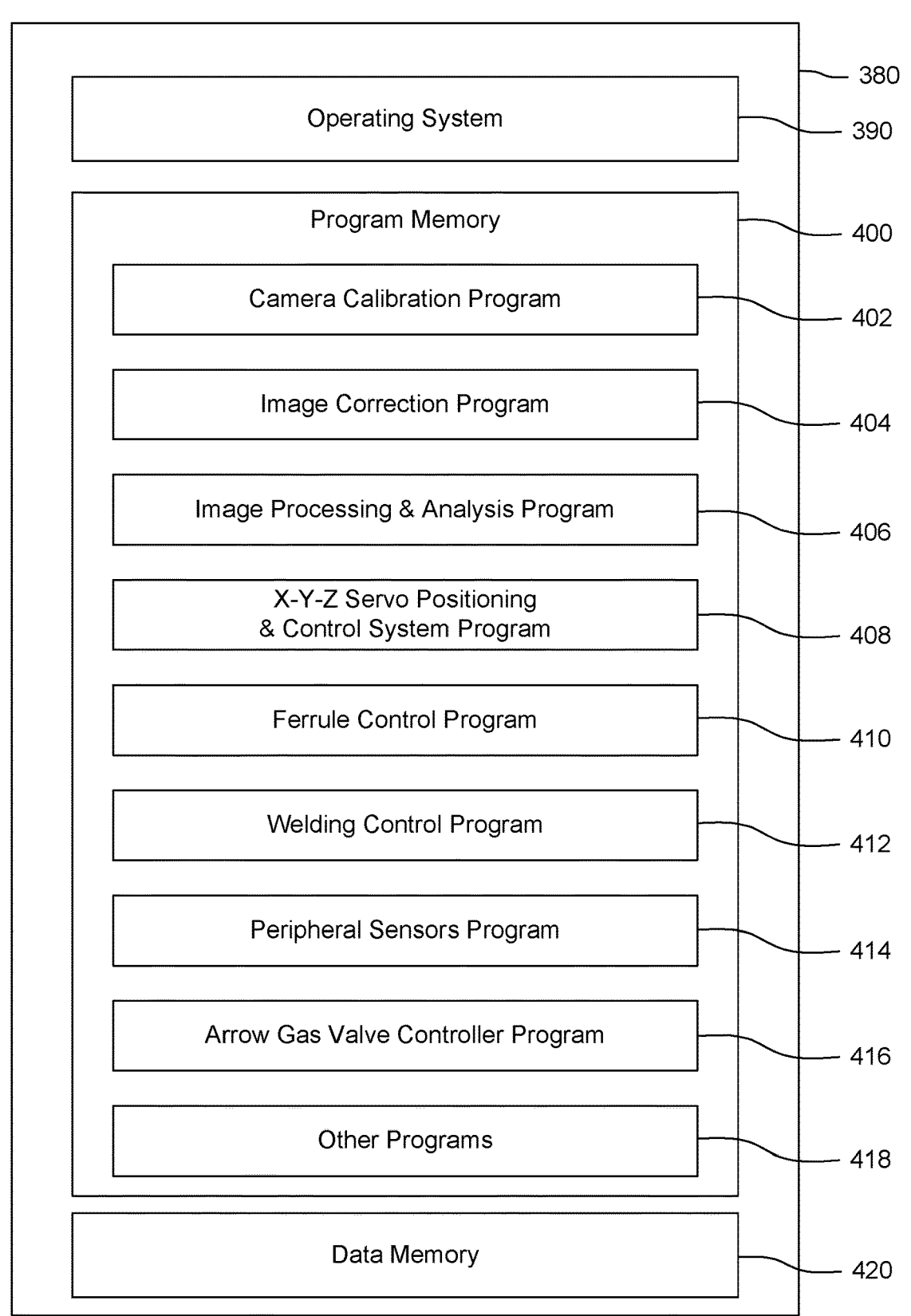
FIG. 9 is a block diagram of the memory map of the computer illustrating the operating system, program memory and data memory components.

Referring to FIG. 9, a computer memory 380 block diagram is shown having the operating system 390, program memory 400 and data memory 420.

Operating system 390 is a conventional operating system for managing the hardware and software resources of computer 14 and may include a conventional Windows or Linux operating system software, a real time operating system (RTOS), or other operating systems and the like. The operating system 390 performs conventional operating system software functions and is capable of executing various programs stored in program memory 400 of computer 14. The operating system 390 is well known technology in the art of computer science.

The program memory 400 comprises a number of software programs for performing tasks according to the preferred embodiment of the invention including the camera calibration program 402, image correction program 404, the image processing and analysis program 406, the x-y-z servo positioning and control system program 408, the ferrule control program 410, the welding control program 412, the peripheral sensors program 414, the argon gas valve controller program 416 and other programs 418.

The data memory 420 is conventional random-access memory (RAM) and stores variables and other data used by the other programs. For example, raw image data acquired by imager 125 and corrected image data are stored in data memory 420. Data memory 420 may also include conventional non-volatile flash memory for storing constant variable and configuration data information.

The camera calibration program 402 determines the required correction parameters to correct raw image data for lens 127 distortion (pin cushion and barrel distortions and the like) and additionally determines the element valves of a homography matrix to correct images for perspective distortion.

The camera calibration program 402 first acquires raw images of a number of 2-D checkerboard patterns of different spatial orientations via imager 125 and lens 127 and stores these raw images in data memory 420. One image includes having the 2-D checkerboard pattern oriented to be flat on the surface 120 and is tagged as the "flat-image".

The flat image is used to correct the image for perspective distortion and to determine the element values of the homography matrix within the camera calibration program 402. The flat image is also used by the image correction program 404 to determine the image-space to object-space and vice versa distance transformation values.

The 2-D checker-board raw image data, taken at different spatial orientations, along with a conventional lens distortion correction program, such as referenced in the "Camera Calibration Toolbox for MATLAB" and offered by The MathWorks, Inc. of Natick, Massachusetts, then processes these raw checkerboard images and calculates the lens distortion parameters used to correct for the lens 127 distortion. There are many programs known in the art to correct images having lens distortion.

The camera calibration program then additionally determines the element values of a homography based transformation matrix to correct for any perspective distortion using the lens distortion corrected flat-image of the 2-D checkerboard placed flat on the embed surface 120. The homography calculations are based upon the assumption that both the embed surface 120 and the image plane of the imager 125 maintain a planar relationship. Homography calculations to correct for perspective distortion is well known in computer vision technology.

The camera calibration lens distortion parameters and the element values of a homography based transformation matrix are stored in a configuration data file located in the non-volatile flash memory within data memory 420 or may be stored within the camera calibration program 402 or other programs.

Usually the camera calibration program 402 is executed infrequently since the lens 127 does not change and the planar relationship between the imager 125 image plane and the surface 120 plane remains constant for similar embed plates 105.

Image correction program 404 first commands the imager 125 to acquire a raw image of the surface 120 (which includes the reflections from the welding sites 110a-110n produced by light source 130) and then inputs the lens distortion parameters and homography transformation matrix element values from the configuration data file stored either in non-volatile memory or camera calibration program 402 program.

The lens and homography correction data from the configuration file are then used by the image correction program 404 to first correct the acquired raw images for lens distortion, and then secondarily correct the lens-corrected image for perspective distortion. The corrected image is then stored in memory 420.

Image correction program 404 also undistorts (i.e., corrects for lens and perspective distortions) the flat-image of the 2-D checker-board raw image and determines the object-space to image-space distance transformation, and vice versa.

For example, the dimensions of the squares on the checker-board pattern are known in object space (the checkerboard may have alternating 1-inch black and white squares). From the corrected image of the checkerboard, a corresponding pixel count is determined for the imaged squares using well known techniques in the art, and the corresponding pixels per inch distance (the image-space to object-space distance transformation) and vice versa is determined.

Also, the image-space area of each pixel has an associated object-space area. For example, if the corrected image of the 1-inch black square yields 100 pixels within the black square image, then each pixel equates to 0.01 square inches (assuming square pixels).

Using the image-space to object-space distance transformation, the image-space coordinates of the image of the registration marker 112 can be calculated. Thus, every pixel has a unique u-v coordinate (in image-space) which maps to an equivalent object space x'-y' coordinate referenced to the coordinate system 122 and vice versa. These values are also stored in the configuration data file.

The image processing and analysis program 406 then processes the corrected surface 120 image previously stored in memory 420 by image correction program 404 by first using a conventional thresholding filter.

Image processing algorithms including thresholding filters, image segmentation, image enhancement, morphological image operations and restoration methods are referenced in many texts including Rafael C. Gonzalez and Richard E. Woods, Digital Imaging Processing (2d ed., Prentice Hall, 2002), among others.

Figure 10:
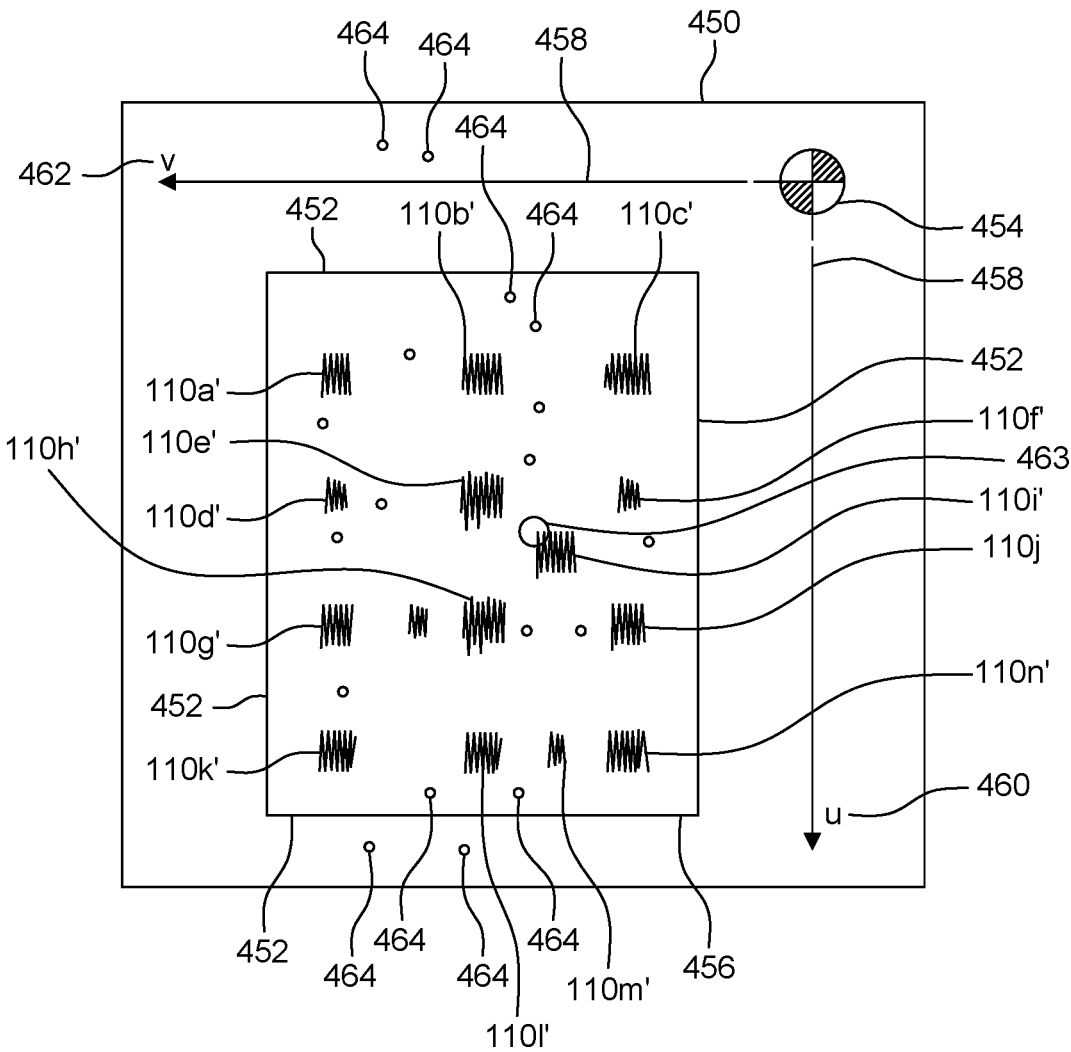
FIG. 10 is an image representation of the field of view of the camera illustrating the imaged embed plate, the welding sites and the salt and pepper noise.

FIG. 10 is an image representation of the field of view of the camera illustrating the imaged embed plate, the welding sites, and salt and pepper noise. A corrected image 450 of the area defined by the field of view of the imager 125 is shown and includes the image 456 of the embed plate 105, the image 452 of the perimeter 129 (see FIG. 1) of the embed plate 105, and the images 110a'-110n' of the welding sites 110a-110n respectively. The welding sites 110a-110n are markings (e.g., grind spots) on the embed plate 105 (i.e., the target metal for welding studs thereto) that are potential locations for a welding site. Accordingly, the welding sites 110a-110n represent welding site candidates that are to be evaluated via imaging processing and verification to determine the viability of using such a welding site candidate as a welding site location for welding a metal stud thereto. Any welding site candidate that is validated as a viable welding site location can be used, whereas any welding site candidate that is determined not to be a viable welding site location can be removed from consideration such that it is not used for welding a metal stud at that location.

Image 450 further includes the image 454 of the registration marker 112 having a conventional superimposed image space u-v coordinate system 458 having u-axis 460 and v-axis 462. The u-v coordinate system 458 defines the pixel coordinates with respect to the image 454 of the registration marker 112. Also visible in the image 450 is salt and pepper noise pixels 464 (not all salt and pepper noise pixels are labelled for clarity). A small selected area 463 of image 110i' is also shown.

Figure 11A:
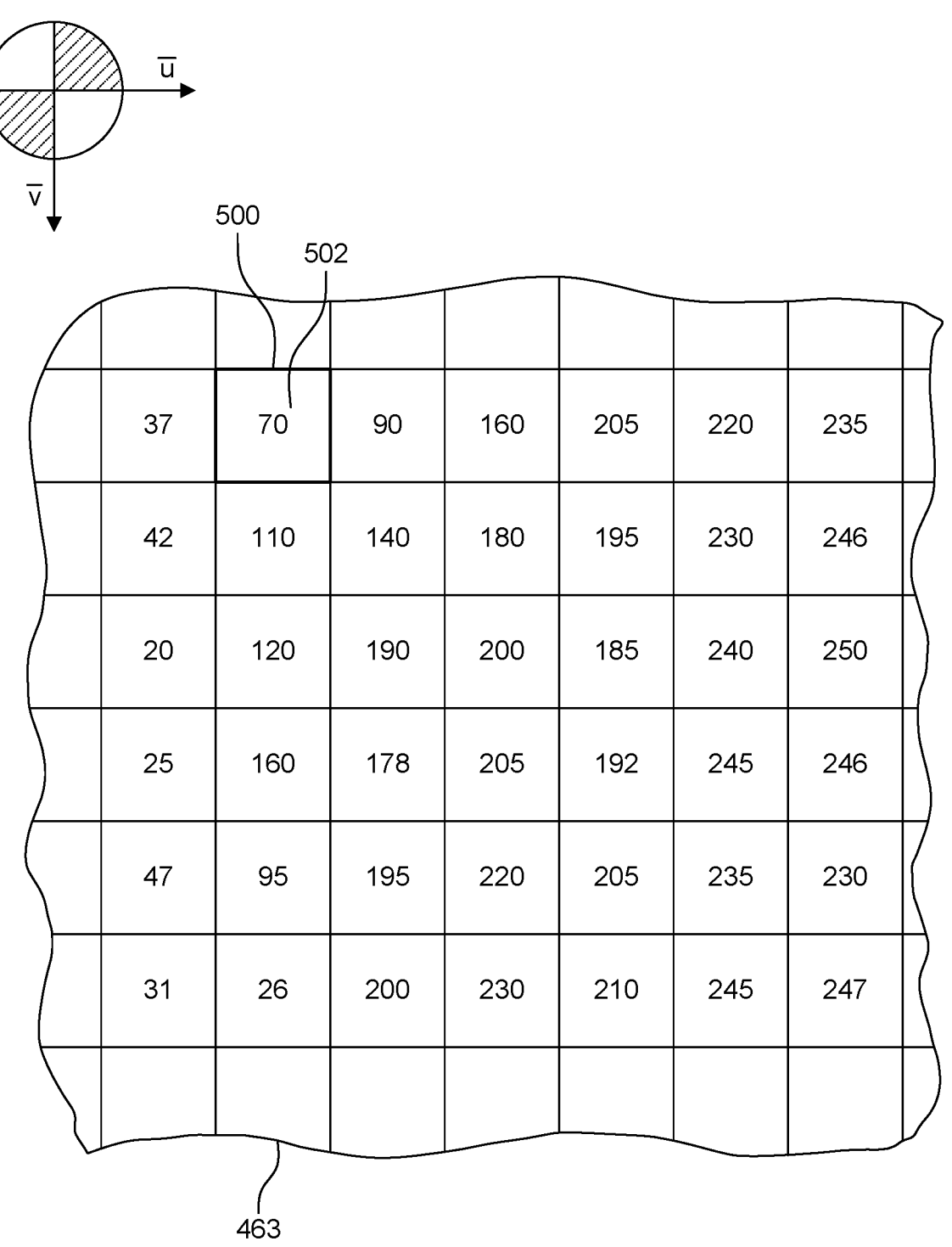
FIG. 11A is a partial raw image of a ground welding site illustrating the pixel intensity values.

Referring additionally to FIG. 11A, the selected imaged area 463 of the imaged ground welding site 110i' is shown explicitly illustrating the rectangular (square) shaped pixels (for example, pixel 500) and the respective 8-bit grayscale intensity values within the border of the individual pixels (for example, the intensity value 70 of pixel 500 is represented by 502). Additionally, the imaged welding sites may be determined using artificial intelligence. Specifically, a trained convolutional neural network (CNN) may be used to determine the imaged welding sites.

Figure 11B:
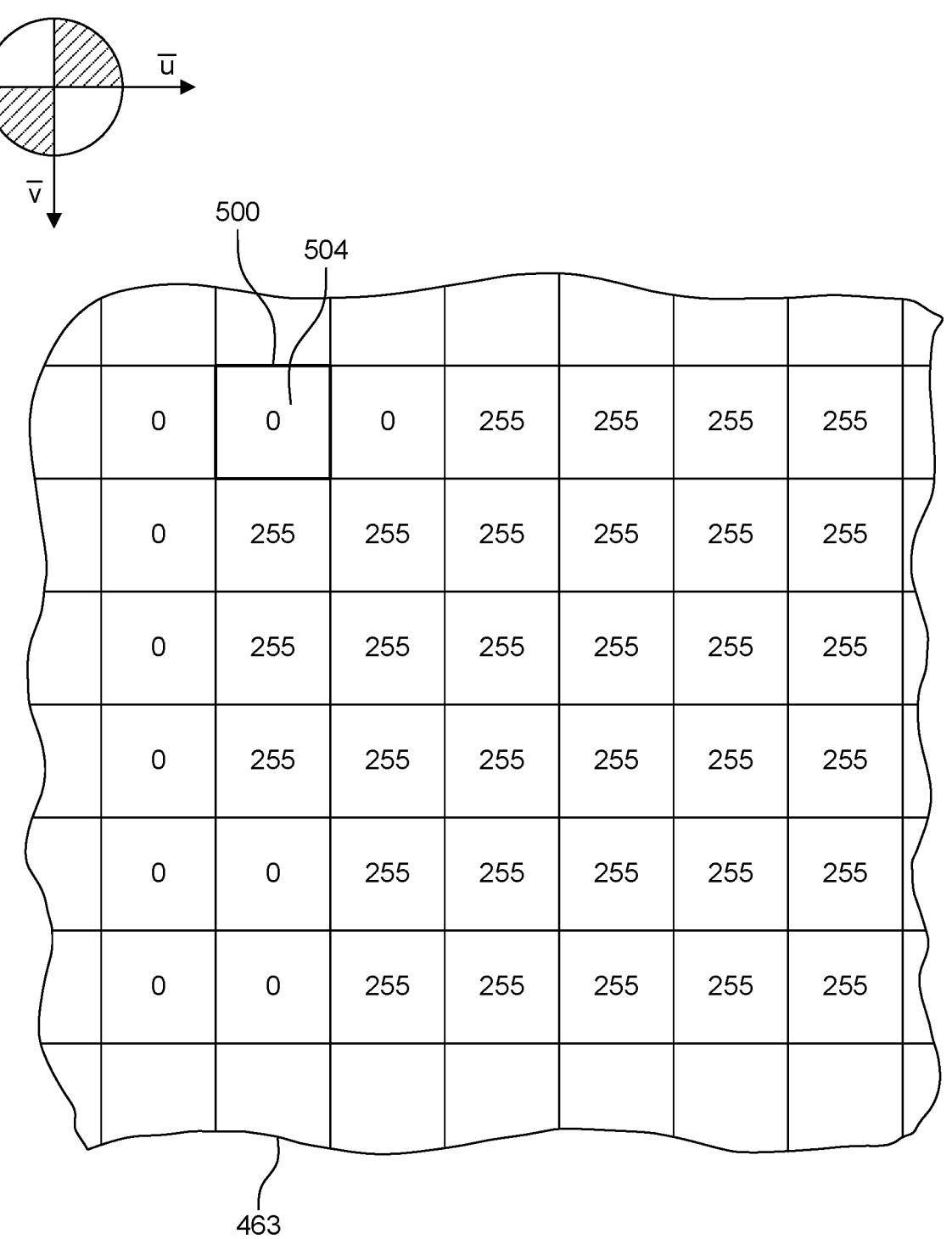
FIG. 11B is a partial threshold filtered image of a welding site illustrating the saturation image intensity limits.

Referring to FIG. 11B, the selected area 463 of the imaged ground welding site 110i' (as shown in FIG. 11A) is depicted after an intensity thresholding value of 100 has been applied. Any pixel grayscale intensity value less than 100 is set to 0 and any pixel value greater than or equal to 100 is set to 255 (maximum grayscale value for an 8-bit quantization). The grayscale intensity value 502 of pixel 500 in FIG. 11A (value is equal to 70) is now changed after thresholding to a grayscale intensity value 504 (value is equal to 0) in FIG. 11B. The pixels intensity values of 0 and 255 may be changed to the intensity values of 255 and 0 respectively using software.

Salt and pepper and Gaussian noise removal is next performed on the threshold corrected image using well known techniques in the image processing art. The images 110a'-110n' of the welding sites 110a-110n are shown blackened against a white background for disclosure purposes even though the actual image would show the images of the welding sites 110a-110n as whitened against a blackened background. Complementing pixel intensity valves is easily done in imaging processing software (see for example the MATLAB command "imcomplement").

Figure 12:
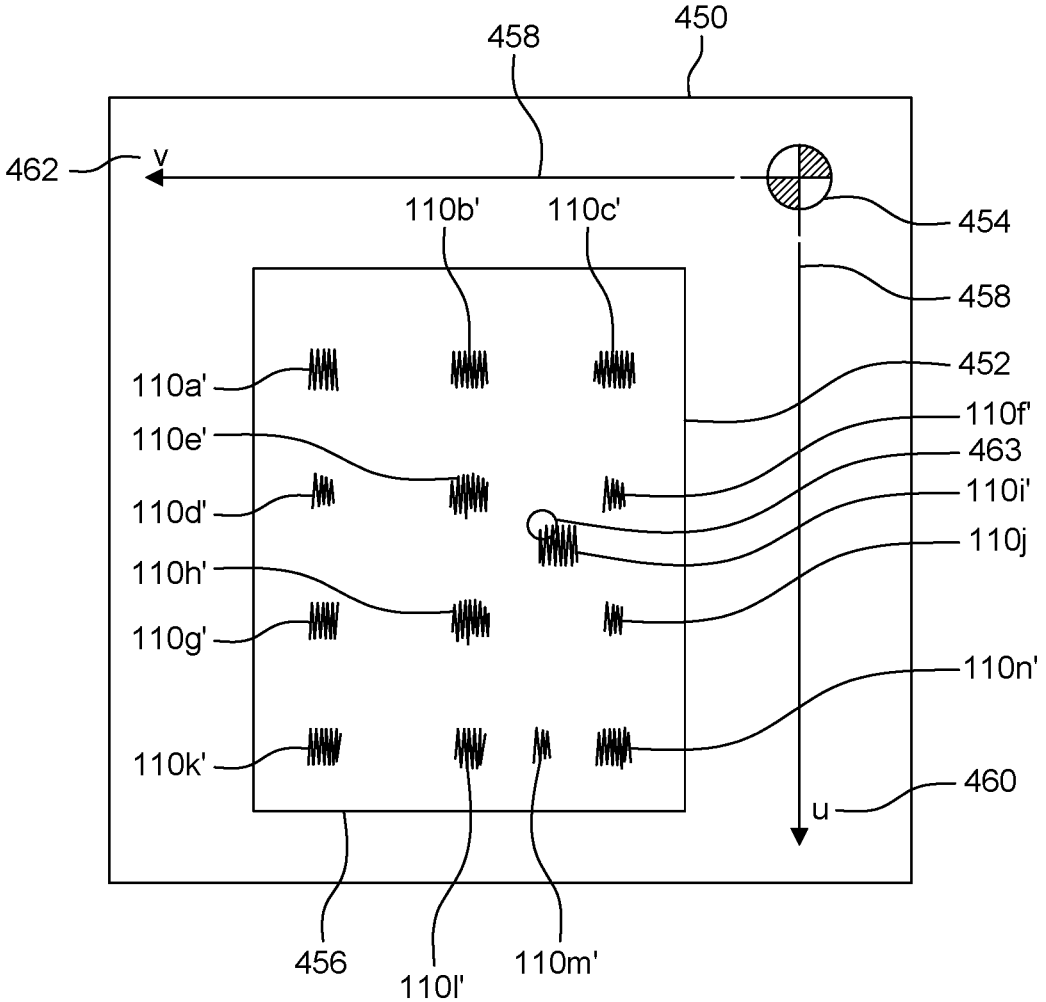
FIG. 12 is a field of view corrected image of the embed plate after thresholding and noise reduction has been applied.

FIG. 12 shows the image 450 after thresholding and noise removal (note that the welding site images 110a'-110n' have been slightly reduced in size and are a grayscale valve of 0 (black representation) and the salt and pepper noise 464 has been removed).

The image processing and analysis program 406 then further processes the threshold and noise mitigated image of both the surface 120 and welding sites 110a-110n using conventional image processing techniques and in particular imaging processing morphological operations as now discussed.

After mitigating the noise in the image, image processing and analysis program 406 may then use morphological operations to determine connected components (i.e., groups or clusters of similar valued pixels that are connected) using a decision rule of pixel connectivity (such as 4-connectivity or 8-connectivity), and further assigning a label to each group.

Figure 13:
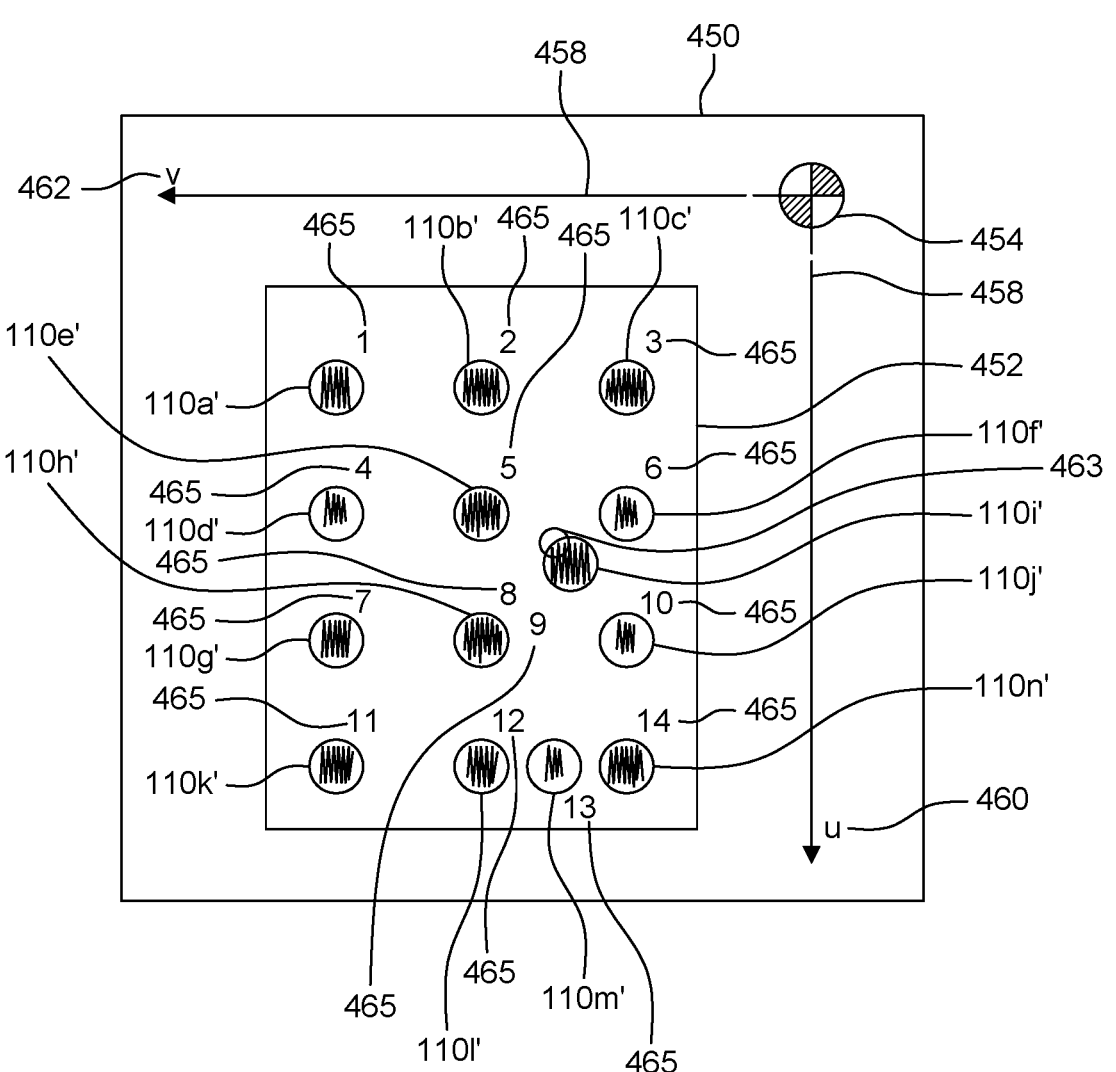
FIG. 13 is an imaged view of a corrected field of view image having the clusters of labelled connected pixels.

FIG. 13 illustrates the image 450 having the connected components (clusters of pixels) defined by labels 465 (numeric labels 1 through 14).

An example of an algorithm for determining the connected components (groups of pixels) and labeling each distinct group is the Hoshen-Kopleman algorithm.

The number of pixels contained within each labeled cluster (pixel area) is then calculated and clusters having less pixel area than needed for welding the stud to surface 120 are eliminated (the equivalent pixel area in object-space area was previously determined in the image correction program 404). For example, the number of pixels contained within each labeled cluster may be compared to a threshold number of pixels corresponding to the minimum acceptable total pixel area. If the number of pixels is less than the threshold number of pixels, the cluster can be removed from consideration. Alternatively, the number of pixels can be converted to a total pixel area and the total pixel area may be compared to a threshold pixel area. If the total pixel area is less than the threshold pixel area, the cluster can be removed from consideration. Those clusters that have at least the requisite number of pixels or requisite total pixel area are considered further as welding site locations by the algorithm. The minimum pixel area required is calculated based upon the operator inputting the shank diameter in inches (or the type of stud which has pre-stored the shank diameter) and using the object-space to image-space transformation values previously obtained in the image correction program 404.

The image processing and analysis program 406 then calculates the area of the largest (maximum) inscribed circle (commonly referred to as MIC) and the center of each inscribed circle (in u-v coordinates) for each cluster. The maximum inscribed circle is the largest circle that can be completely enclosed within the pixel area of a pixel cluster (i.e., within the outer boundary of the pixel cluster) without overlapping with a pixel that has an intensity value that is less than an intensity threshold (e.g., an intensity threshold value of 100 in the above example). Clusters having "holes" within their respective perimeter are modified by creating a path from the perimeter to the hole (i.e., to open the hole to the exterior of the cluster). In other words, a low-intensity pixel falling below the intensity threshold may be completely surrounded by high-intensity pixels that meet the intensity threshold, thus appearing as a "hole". In this case, pixel grayscale intensity value of high-intensity pixels that are located between the low-intensity pixel and a nearest outer perimeter of the cluster may be switched to 0, thereby creating a pathway of "0" value pixels from the hole to the nearest outer perimeter.

An iterative algorithm for performing this calculation is "Poles of Inaccessibility: A Calculation Algorithm for the Remotest Places on Earth" by Garcia-Castellanos & Lombardo, Scottish Geographical Journal vol. 123, No. 3, 227-233, September 2007, modified for pixelated data. Other algorithms are available, for example, "An efficient Algorithm to Calculate the Center of the Biggest Inscribed Circle in an Irregular Polygon" by Oscar Martinez, arxiv.org (web). Other programs utilize a Voronoi diagram, and still other programs iteratively solve for the MIC. Polygons can be formed using the u-v coordinates of the perimeter pixels.

The areas of each MIC for each cluster is then compared against the bottom shank surface area of the chosen stud. Clusters having MIC areas less than the bottom shank surface area are further eliminated from welding consideration.

Figure 14A:
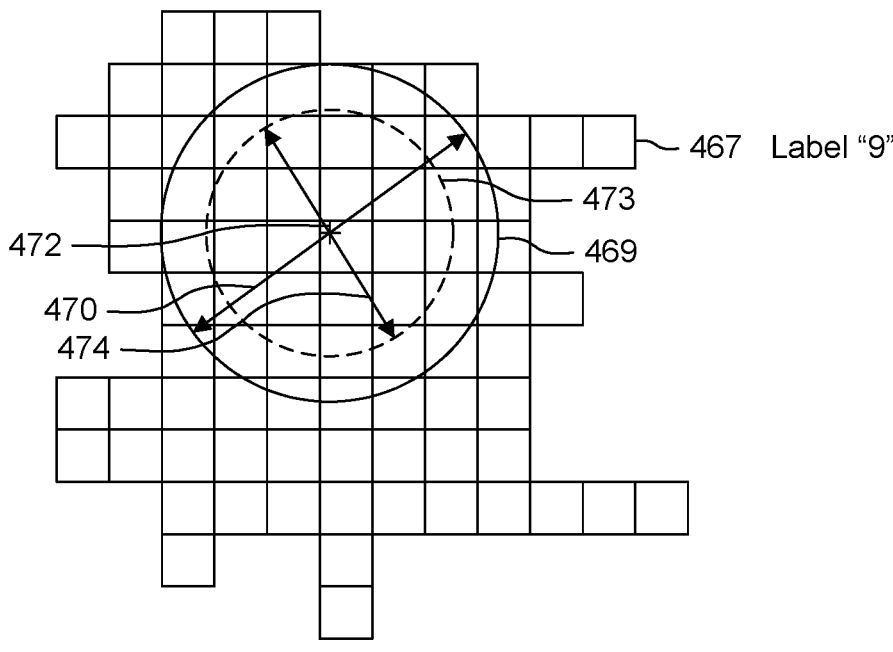
FIG. 14A is a view of a pixel cluster having sufficient pixels to support the minimum image-space welding area.

As an example, and referring to FIG. 14A, a first cluster 467 of pixels representing the image 110i' and having the label "9" is shown. The calculated first maximum inscribed circle 469 is shown having a diameter 470 and having a center 472 (having u-v coordinates) defined in image-space. Also shown is an image-space representation of the minimum required circular area 473 to weld the stud 162 to surface 120 having diameter 474 and based upon the specification of stud 162 (i.e., the area of bottom surface 170 of shank 166) and centered on the center 472.

The first cluster 467 does meet the minimum area requirements for welding a stud 162 and will be further included for welding site consideration.

Figure 14B:
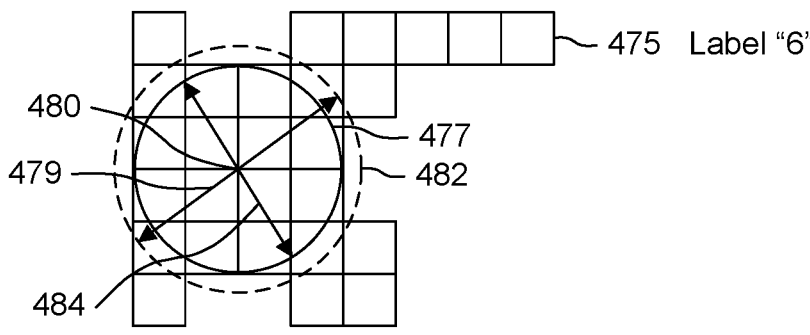
FIG. 14B is a view of a pixel cluster having insufficient pixels to support the minimum image-space welding area.

Referring now to FIG. 14B, a second cluster 475 of pixels representing the image 110f and having the label "6" is shown. The calculated second maximum inscribed circle 477 is shown having a diameter 479 and having a center 480 defined by the image-space u-v coordinates. Also shown is an image-space representation of the minimum required circular area 482 to weld the stud 162 to surface 120 having image-space diameter 484 based upon the specification of stud 162 (i.e., the area of bottom surface 170 of shank 166).

The second cluster 475 does not meet the minimum area requirements for welding a stud 162 and will be eliminated from further welding site consideration.

The centers of the MIC for those clusters having MIC areas larger than the bottom shank surface area are then used to calculate the distance (in u-v coordinates) between each MIC center. Those center-to-center distances less than the minimum distance required to weld the stud to the surface 120 are eliminated and their respective clusters are removed. In other words, both clusters are removed from consideration. This assures that the collet and ferrule support assembly 100 has sufficient room between the welding sites to weld the stud without interference from previously welded studs. Alternatively, one of the clusters may be removed from consideration while the other cluster remains in consideration. Which cluster of the two clusters that is selected for removal and which cluster is kept for further consideration may be based on one or more factors, including the one having the smaller total area or the smaller inscribed circle may be removed while the other cluster remains for consideration. Alternatively, which cluster has a smallest average center-to-center distance to other clusters may be removed while the other cluster remains for consideration.

Figure 15:
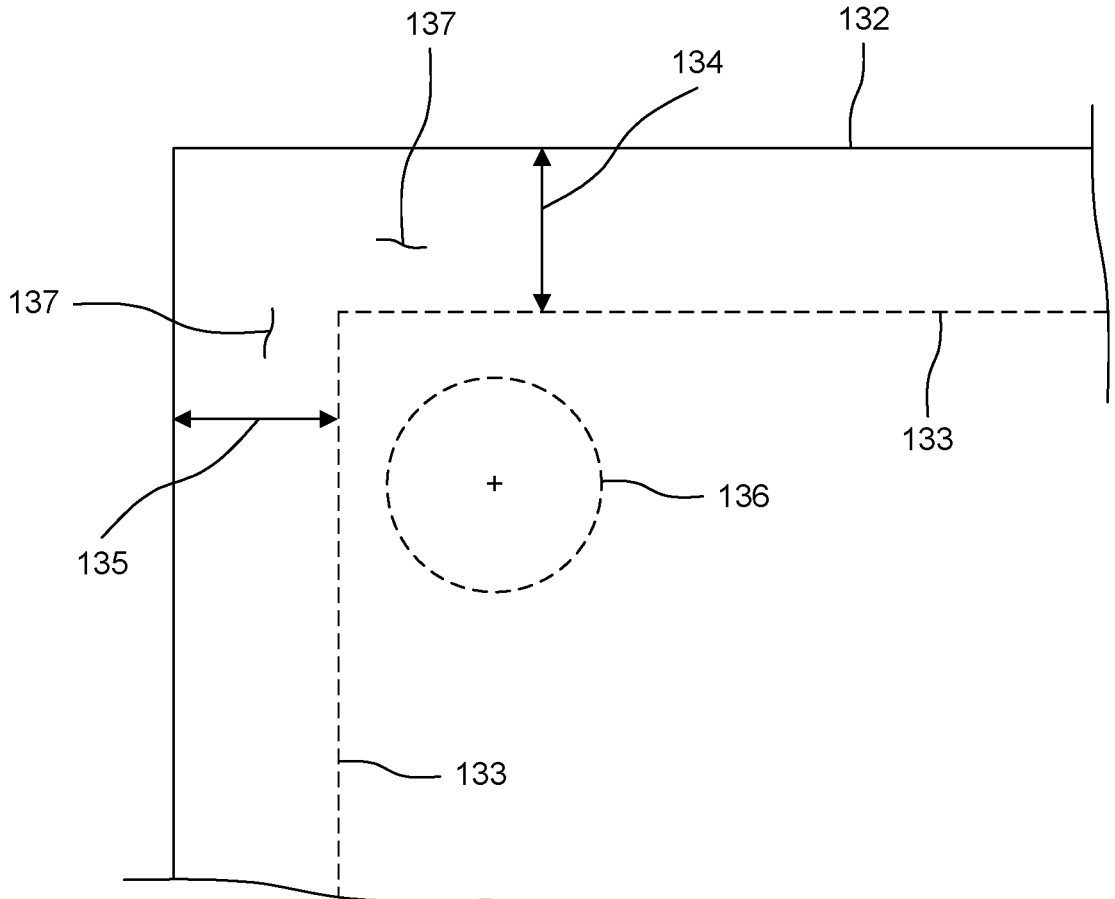
FIG. 15 is a top image view of a corner of the embed plate showing the imaged perimeter of the embed plate and a predefined image-space secondary inside perimeter. The area between the two perimeters defines a no weld zone.
Figure 17A:
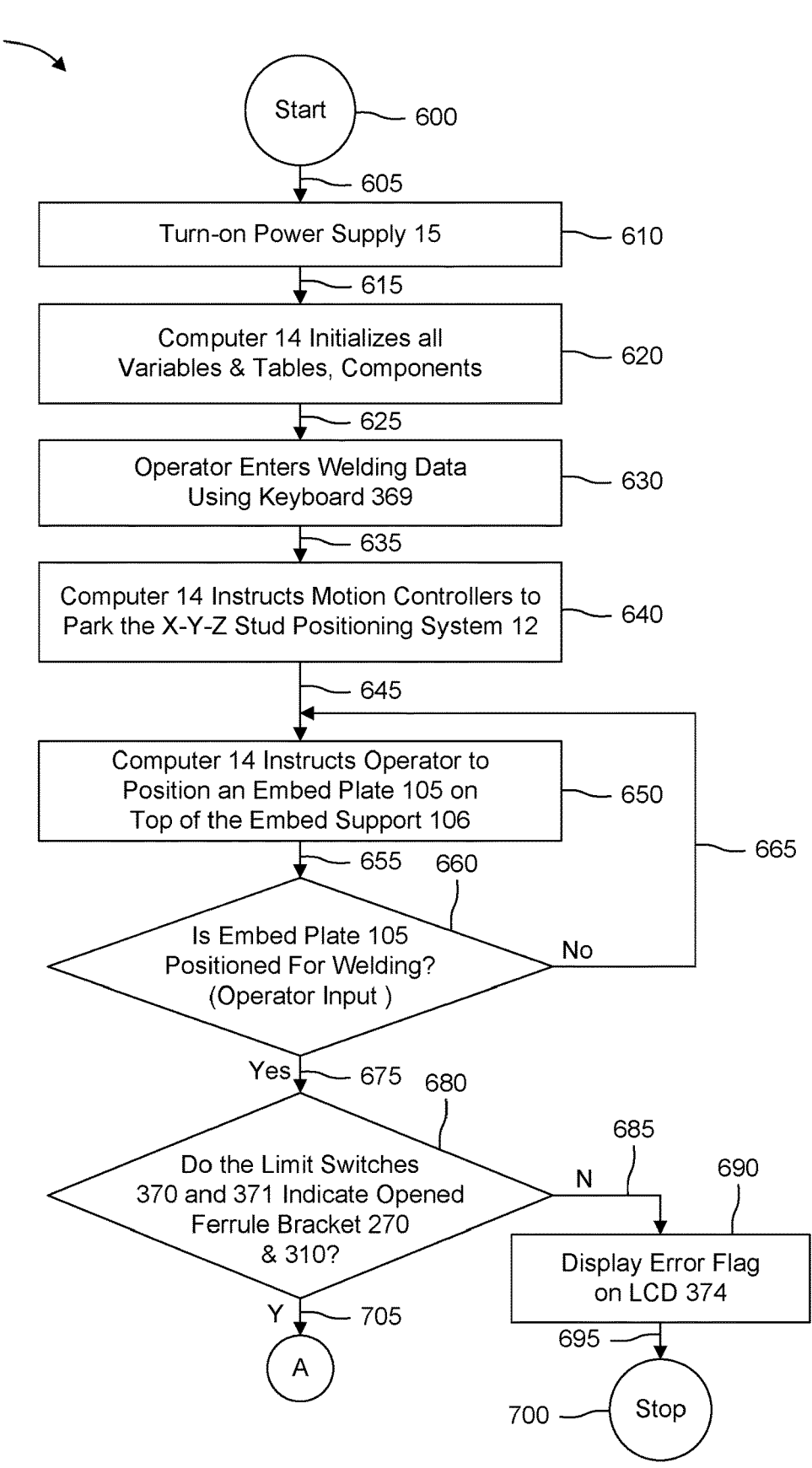
Figure 17C:
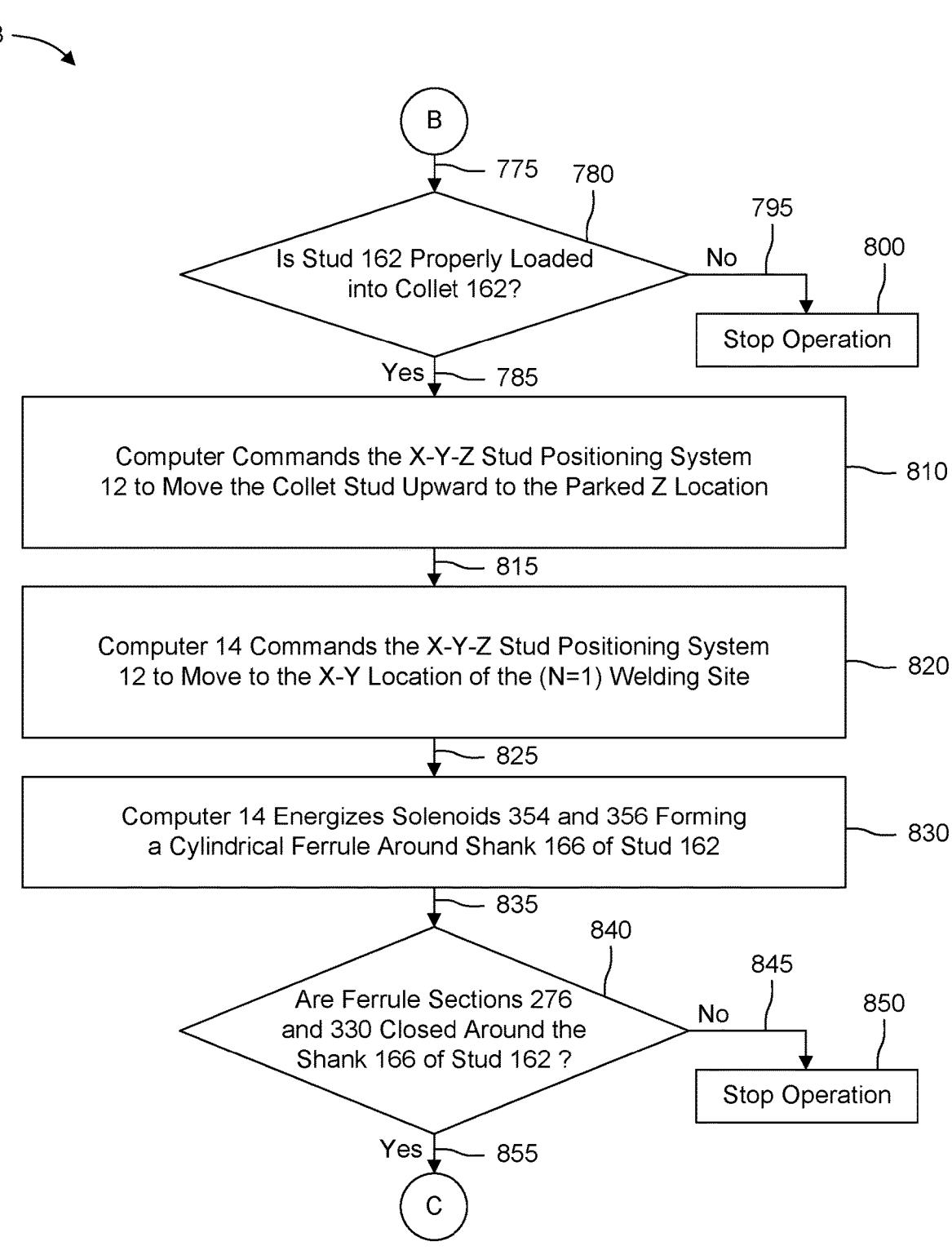
Figure 17E:
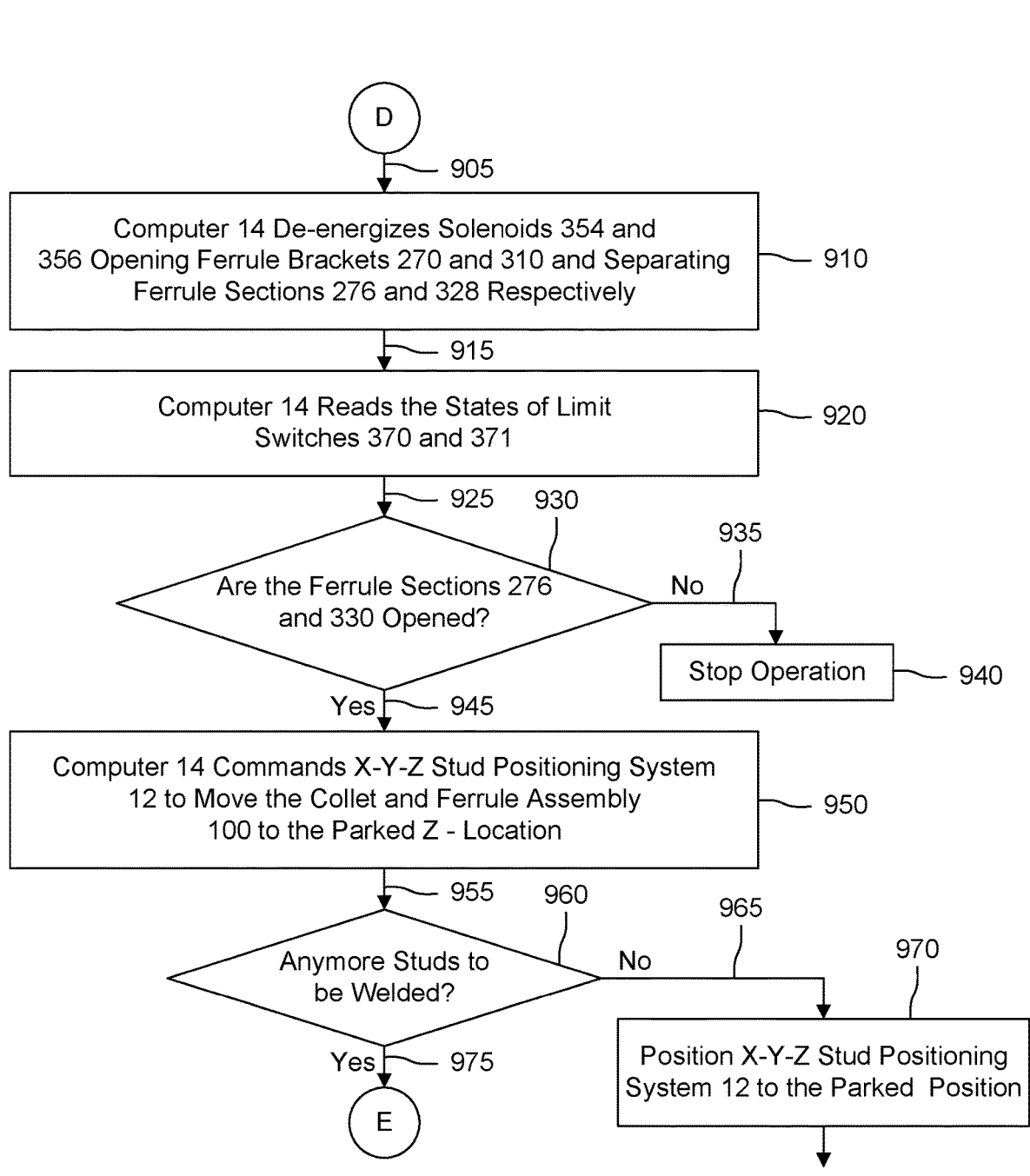
Figure 17F:
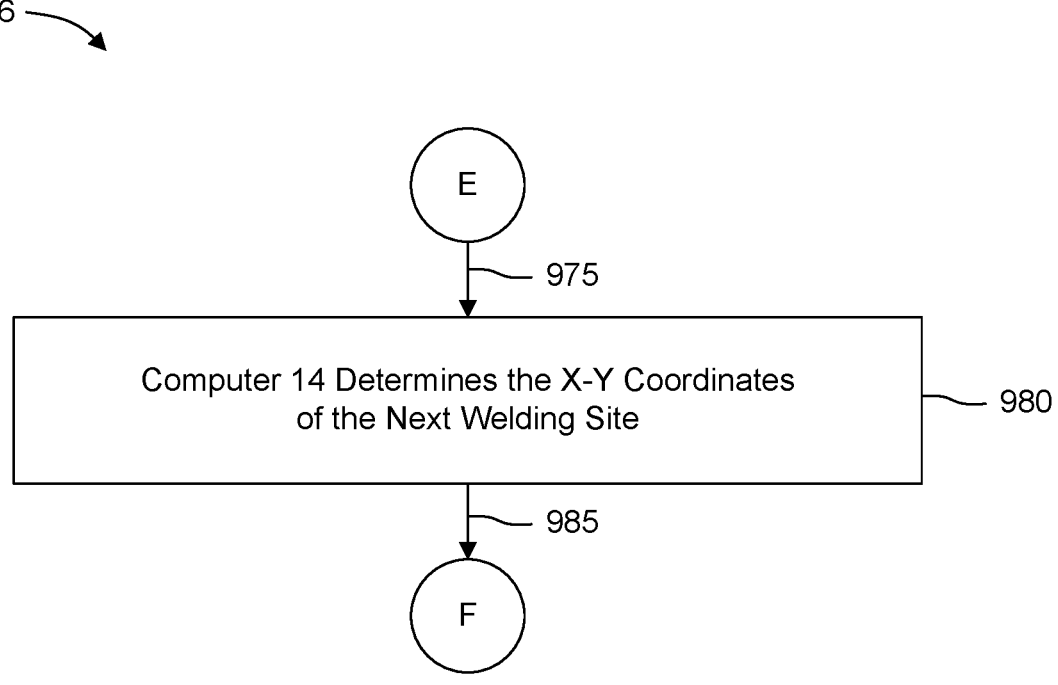

Referring to FIG. 15, the image processing and analysis program 406 further calculates a second image-space perimeter, also referred to as an inside image perimeter 133, inwardly offset by an image-space vertical distance 134 and an image-space horizontal distance 135 from the image 132 of the embed plate perimeter 129. The u-v vertical distance 134 and the horizontal distance 135 are calculated from the object-space distance values (using the image-space to object-space transformation) input into the computer 14 via keyboard 369 by the operator. The area bordered by the outside image perimeter 132 and the inside image perimeter 133 defines a 'No Weld' image-space area 137.

The image processing and analysis program 406 then determines if any of the minimum required welding area 136 (in image-space) (e.g., minimum required circular area 473) centered on the MIC to weld the stud 162 would intersect the 'No Weld' area 137. Any welding site candidate (i.e., pixel cluster) that corresponds to stud 162 having its respective minimum required image-space area intersect the area 137 is discarded from any further welding considerations and not listed in the welding table.

This prevents the welding of studs 162 too close to the perimeter 129 of embed plate 105.

The centers for each MIC of the remaining welding sites (i.e., each of the remaining welding site candidates or pixel clusters) are then stored in a welding site table which lists the MIC center coordinates (in u-v coordinates) for each remaining cluster. The image-space u-v coordinates for each center are then transformed to object space x'-y' coordinates and x-y coordinates using the object-space to image-space distance transformation calculated in the image correction program 404 and corrected for any offsets. Thus, any remaining welding site candidate that has not be eliminated based on not satisfying welding site criteria is used as a welding site location for affixing a metal stud thereat. All remaining welding site candidates may be used as welding site locations at which the controller (e.g., one or more controllers implementing control programs 408, 410, and 412) automatically places a metal stud for welding. Alternatively, a user may have an option to select from the remaining welding site candidates to be used as welding site locations via manual input or based on a priority selection. It will be further appreciated that the evaluation stages that result in removal of pixels clusters from consideration as welding site locations may be performed in a different order. For example, the largest inscribed circle size could be performed prior to the total pixel area evaluation. Or the proximity evaluation with respect to a peripheral edge of the embed plate 105 may be performed first.

It is therefore understood that a table of x'-y' coordinates (with respect to the registration marker 112) of each welding site is determined from the raw image data of surface 120. Conventional calibration techniques have previously calculated the offsets of the x'-y'-z' coordinate system 122 to the coordinate system 19, and therefore any x'-y'-z' location is also known in the x-y-z coordinate system 19. Coordinate transformations from one to another Cartesian coordinate system is well known in the art and may include translational and rotational transformations.

The x-y-z servo positioning and control system program 408 controllably moves the collet and ferrule support assembly 100 to a desired x-y-z location. The acceleration and speed profiles for the x-axis, y-axis and z-axis linear movement are controlled by the x-axis, y-axis, and z-axis motor controllers 70, 72 and 74 respectively and are programmed by computer 14.

For example, to position a stud over a particular welding site the x-y welding site coordinates stored in the welding site table is received by the x-y-z servo positioning and control system program 408. Program 408 then sends the proper motion commands to the x-axis controller 70 and y-axis controller 72 for positioning the collet and ferrule support assembly 100 directly over the center of the respective MIC for that welding site. The x-y-z servo positioning and control system program 408 then receives the z-direction data and moves the collet and ferrule support assembly 100 to the desired z-axis coordinate to first have the ferrule brackets 270 and 310 forcibly contact the surface 120 and then to continue in a predetermined downward direction to forcibly have the flux pellet 168 of stud 162 contact the surface 120.

The x-y-z servo positioning and control system program 408 may also receive x-y coordinates of the stud loading position. For the stud loading cycle, the x-y-z servo positioning and control system program 408 homes the z-axis and then sends the proper motion commands to the x-axis controller 70 and y-axis controller 72 to position the collet and ferrule support assembly 100 directly over the center of the head of the unwelded stud. The x-y-z servo positioning and control system program 408 then receives the z-direction data and moves the collet and ferrule support assembly 100 to the desired z-axis coordinate to load the stud 162 into collet 156.

The z-direction distance for both the welding and loading of the stud is previously calculated knowing the stud 162 length, the z-direction distance sensor 115 input (offset corrected) and other parameters.

It is therefore understood that x-y-z positioning and control program 408 controls both the linear speed and acceleration of the x-axis, y-axis and z-axis linear motion systems for positioning the collet and ferrule support assembly 100 at a desired x-y-z position.

The ferrule control program 410 controls the of electrical activation of solenoids 354 and 356 via bus 375 and local buses 366 and 368 respectively. Electrically activating solenoids 354 and 356 results in a pulling force on tabs 262 and 266 of ferrule brackets 270 and 310, respectively. This force mates the semi-cylindrical ferrule section 276 with the semi-cylindrical ferrule section 328 to form a cylindrical shaped ferrule around the shank 166 of stud 162.

The welding control program 412 communicates with and controls the welding controller 18 and sends the welding parameters required by the welding controller 18 to success-fully perform the stud welding function. For example, the welding current and welding time may be transmitted from computer 14 via bus 376 to the welding controller 18. The welding parameters may be input into computer 14 by the operator using keyboard 369 or a touch screen activated liquid crystal display 374, or previously stored in the con-figuration data file previously mentioned. Also, a "Weld Now" command is sent to the welding controller 18 which first initiates the pilot arc and then initiates the arc weld welding the stud 162 to the embed plate 105.

The peripheral sensors program 414 interfaces with and receives z-axis distance data from sensor 298 via local bus 118 and master bus 375. The peripheral sensor program 414 also interfaces with and receives data from stud sensor via local bus 299 and master bus 375 to indicate the presence or absence of a loaded stud 162 in collet 156.

The argon gas valve controller program 416 controls the electrically responsive gas valve 146. To open valve 146, program 416 sends an "Open Valve" command via bus 375 and control cable 145 to the gas valve 146 which then allows the argon gas to flow through conduits 143 and 144 (and therefore to ferrule brackets 270 and 310). To close valve 146, program 416 sends a "Close Valve" command to the gas valve 146 via bus 375 and control cable 145 which stops the argon gas flow to conduits 143 and 144 (and therefore to ferrule brackets 270 and 310).

The other programs 418 include programs not explicitly described above for providing the necessary functionality for the improved robotic stud welding apparatus 10 to achieve the stated objects.

Referring now to FIG. 16, a summary of the process steps for obtaining a list of valid welding sites from a raw image of the embed plate 105 is shown and begins with process step 505.

Process step 505 obtains the raw image of the embed plate 105 from the imager (camera) 125 using program 404.

Process step 510 corrects the raw image (bit map) for lens distortion using program 404.

Process 520 corrects the lens corrected image for per-spective distortion using program 404.

Process step 525 threshold filters the lens and perspective corrected image using program 406.

Process 530 removes noise from the threshold filtered image using program 406.

Process 535 determines pixel connectivity and clusters of pixels and then further labels each cluster using program 406.

Process 540 determines the number of pixels in each labelled cluster using program 406.

Process 545 eliminates those clusters having their respec-tive pixel areas less than the minimum required pixel area to weld a stud 162 using program 406.

Process 550 calculates the maximum inscribed circle (MIC) area or diameter and center u-v coordinates for the remaining clusters using program 406.

Process 555 eliminates those clusters having a MIC pixel area or diameter less than the minimum pixel area or diameter required to weld a stud 162 using program 406.

Process 560 calculates the MIC center-to-center distance for the remaining clusters using program 406.

Process step 565 eliminates those clusters not meeting the minimum MIC center-to-center clearance distance using program 406.

Process 570 eliminates those clusters which have their stud 162 image-space welding area intersecting the 'No Weld" area defined by the area between the image 132 of the embed plate 105 perimeter 129 and the inside offset perim-eter image 133 defined by the operator using program 406.

Process 575 then creates a welding site coordinate table in u-v, x'-y', and x-y coordinates using program 406.

Process 580 completes the welding site coordinate table by appending the z-direction distance data to the welding site coordinate table. The z-direction distance is calculated and offset corrected knowing the z-direction distance from the sensor 115, the stud 162 length, and other parameters using program 406.

The following operational disclosure assumes that the system has been calibrated for lens distortion and perspec-tive distortion, and that the image-space to object-space transformation parameters have also been determined as previously determined by program 404.

In operation and referring additionally to FIGS. 17A-17F, the operator begins the operation of the improved robotic stud welding apparatus 10 beginning with the START step 600. Operational flow then continues via arrow 605 to step 610.

In step 610, electrical power is supplied to the improved robotic stud welding apparatus 10 by the operator (or other means) turning on power supply 15. Operational flow con-tinues via arrow 615 to step 620.

In step 620, the computer 14 performs a power-on-reset procedure which initializes all variables and tables, de-energizes the solenoids 354 and 356 (which opens the ferrule brackets 270 and 310), commands the x-y-z stud positioning system 12 to move to the predefined 'home' position, turns on the blower 309 and the light source 130, initializes the imager 125, initializes the motor controllers 70, 72 and 74, initializes the stud loading mechanism for loading a stud 162, and performs other tasks to place the improved robotic stud welding apparatus 10 in a condition for proper opera-tion. Operational flow continues via arrow 625 to step 630.

In step 630, the operator inputs the required data via the keyboard 369 for welding a stud 162 to the embed plate 105. This data includes the stud data (size, shank length and stud diameter), the peripheral offset distance to prevent welding studs 162 close to the embed plate 105 perimeter 129, welding parameters such as desired welding current, dwell time and the like. The operator could input this data indi-vidually when queried or could select the stud 162 and other required data from a pull-down list or the like. After com-pleting the data entry, operational flow continues via arrow 635 to step 640.

In step 640, the computer 14 instructs the motion con-trollers 70, 72 and 74 to move the x-y-z stud positioning system 12 to the 'park' position opening an area under the positioning system 12 so that imager 125 has an unob-structed view of the entire embed support structure 106. The park position and home position may be one in the same. Operational flow continues via arrow 645 to step 650.

In step 650, computer 14 instructs the operator to position an embed plate 105 on top of the embed plate support structure 106 and queries the operator if this task was accomplished. The manual process of positioning the embed plate 105 on top of the embed plate support structure 106 could also be automated. Operational flow continues via arrow 655 to step 660.

In step 660, the computer 14 waits for the operator's affirmative response that the embed plate 105 is properly positioned. If the embed plate 105 is not properly positioned, operational flow continues via arrow 665 back to step 650. If the embed plate 105 is properly positioned, operational flow continues via arrow 675 to step 680.

In step 680, computer 14 checks the state of the ferrule bracket 270 and the ferrule bracket 310 limit switches 370 and 371 respectively to ensure the ferrule brackets 270 and 310 are both opened. If the ferrule brackets 270 and 310 are closed, operational flow continues via arrow 685 to step 690 which displays an error flag on liquid crystal display 374 and operational flow continues via arrow 695 to step 700 which stops further operation of the improved robotic stud welding apparatus 10. If the ferrule bracket limit switches 370 and 371 indicate that the ferrule brackets 270 and 310 are both opened, operational flow continues via arrow 705 to step 710 (via 'A').

In step 710, the computer 14 queries the operator if the arc welding process should begin. To begin the arc welding process, the operator selects the 'Begin Welding' command using the keyboard 369 or selectively chooses the command from the touch screen enabled liquid crystal display 374. Operational flow continues back via arrow 715 to the beginning of step 710 until an affirmative response is input (or chosen) by the operator. Upon receiving the 'Begin Welding' affirmative response, operational flow continues via arrow 725 to step 730.

In step 730, the computer 14 commands the imager 125 to image the field of view image 450 containing the embed plate 105 (and therefore the embed plate perimeter 129), the previously ground welding sites 110a-110n, and the registration marker 112. The field of view raw image 450 is subsequently stored in memory 420. Operational flow continues via arrow 735 to step 740.

In step 740, the computer 14 corrects the field of view raw image 450 for lens distortion and perspective distortion using the image correction program 404. The lens and homography correction data from the configuration file are used by the image correction program 404 to first correct the acquired raw images for lens distortion, and then secondarily correct the lens-corrected image for perspective distortion. At this point the image is fully corrected and subsequently stored in data memory 420. Operational flow continues via arrow 745 to step 750.

In step 750, the computer 14, using the image processing and analysis program 406 to correct the field of view image 450 and in particular the image of surface 120 stored in memory 420, calculates a list of the permitted object-space x-y coordinates of the centers of the MIC for each welding site meeting the selection process. Operational flow continues via arrow 755 to step 760.

In step 760, the computer 14 commands the x-y-z positioning system 12 to move to the x-y stud loading position of the stud loading mechanism 16. Note that the ferrule brackets 270 and 310 are in the opened position. Operational flow continues via arrow 765 to step 770.

In step 770, the computer 14 commands the x-y-z positioning system 12 to move the collet 156 from the present (parked) z-location downward to load the stud 162 into collet 156. Operational flow continues via arrow 775 to step 780 (via 'B').

In step 780, the computer 14 then checks the stud sensor 298 to make sure that the stud 162 is loaded into the collet

156 and held by the fingerlike grippers 159. If the stud 162 is not properly loaded into collet 156, operational flow continues via arrow 795 to step 800 which terminates the operation of the improved robotic stud welding apparatus 10. An error flag is also displayed on the LCD 374. If the stud is properly loaded into the collet 156, operational flow continues via arrow 785 to step 810.

In step 810, the computer 14 then commands the x-y-z stud positioning system 12 to move in the upward z-direction and back to the parked z-location. At this point the stud 162 has been loaded into the collet and repositioned at the parked z-location. Operational flow continues via arrow 815 to step 820.

In step 820, the computer 14 commands the x-y-z stud positioning system 12 to move to the x-y location of the first welding site listed in the welding table. Note that there is no z-axis linear system movement 40 for this step. Operational flow continues via arrow 825 to step 830.

In step 830, the computer 14 sends electrical signals to energize the solenoids 354 and 356 forcing the ferrule brackets 270 and 310 inward towards each other and thus forming a cylindrical ferrule from the two touching semi-cylindrical ferrule sections 276 and 328. Operational flow continues via arrow 835 to step 840.

In step 840, the computer 14 inputs the state of the limit switches 370 and 371 for ferrule brackets 270 and 310 respectively to ensure that the ferrule sections 276 and 328 are closed. If the ferrule sections are not closed, operational flow continues via arrow 845 to step 850 which stops the operation of the improved robotic stud welding apparatus 10. If the ferrule sections are closed, operational flow continues via arrow 855 to step 860 (via 'C').

In step 860, the computer 14 commands the x-y-z stud positioning system 12 to controllably move the collet and ferrule support assembly 100 in the downward z-direction a distance calculated from the input data to have the closed semi-cylindrical ferrule sections 276 and 328 contact the surface 120.

This input data includes distance sensor 115 data, the stud data (for example stud length), the encoder data from the BLDC servo motor 55, and other necessary data to controllably contact the bottom surfaces of the closed semi-cylindrical ferrule sections 276 and 328 with the surface 120. All z-distance data is offset corrected, as necessary. As the z-direction motion continues, the ferrule sections 276 and 328 are spring-ably forced downward and held in place by springs 221, 222, 223, and 224. Operational flow continues via arrow 865 to step 870.

In step 870, motion continues in the z-direction until the stud 162 goes through the formed cylindrically shaped ferrule (formed when the ferrule brackets 270 and 310 are closed) and the pellet 168 contacts surface 120. At this point the stud 162 is spring-ably biased and forcibly held in place by spring 171 and the z-direction motion is stopped. Operational flow continues via arrow 875 to step 880.

In step 880, computer 14 commands the gas valve 146 to open which allows the pressurized argon gas to flow via conduits 143 and 144 into the closed ferrule brackets 270 and 310 and around the shank 166. The computer 14 further commands the welding controller 18 to begin the arc welding process. In response to the computer 14 commands, the welding controller 18 initiates the pilot arc followed by the large welding arc. A short time thereafter, computer 14 commands the x-y-z stud positioning system 12 to lift, dwell (pause) and then plunge the stud 162 into the molten metal produced by the welding arc. The lift and plunge distances and dwell time are known given a particular stud 162, welding current and other parameters. Operational flow continues via arrow 885 to step 890.

In step 890, the welding controller 18 terminates current flow to the stud 162 extinguishing the welding arc and sends a 'Weld Complete' signal to the computer 14 indicating that the welding process has completed. Operational flow continues via arrow 895 to step 900.

In step 900, the computer 14 responds to the 'Weld Complete' signal from the welding controller 18 and commands the gas valve 146 to close stopping the flow of argon gas to the ferrule brackets 270 and 310, and further commands the x-y-z stud positioning system 12 to move a short distance upward in the z-direction to enable the ferrule brackets 270 and 310 to open and clear the surface 120. Operational flow continues via arrow 905 to step 910 (via 'D').

In step 910, the computer 14 sends electrical signals to deenergize the solenoids 354 and 356. Deenergizing the solenoids 354 and 356 causes the ferrule brackets 270 and 310 to pivotally open (separate) from each other in response to the spring action of springs 320 and 322. Operational flow continues via arrow 915 to step 920.

In step 920, the computer 14 inputs the state of the limit switches 370 and 371 for ferrule brackets 270 and 310. Operational flow continues via arrow 925 to step 930.

In step 930, the computer 14 determines if the ferrule sections 276 and 328 have opened from the limit switches 370 and 371 state input. If the ferrule sections 276 and 328 are not opened, operational flow continues via arrow 935 to step 940 which stops the operation of the improved robotic stud welding apparatus 10. If the ferrule sections 276 and 328 are separated, operational flow continues via arrow 945 to step 950.

In step 950, the computer 14 commands the x-y-z stud positioning system 12 to move upward in the z-direction back to the parked z-location. Operational flow continues via arrow 955 to step 960.

In step 960, the computer checks if more studs 162 are to be welded. If no additional welding sites are available (i.e., there are no additional blank welding sites), operational flow continues via arrow 965 to step 970.

In step 970, the computer 14 commands the x-y-z stud positioning system 12 to move to the parked position. The improved robotic stud welding apparatus 10 then awaits a subsequent operator command. If additional welding sites are available for welding, operational flow continues via arrow 975 to step 980 (via 'E').

In step 980, the computer 14 determines the x-y coordinates of the next available welding site from the list of permitted welding sites. Operational flow continues via arrow 985 back to step 760 (via 'F').

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

The invention claimed is:

1. A system for automatically identifying one or more welding site locations on a surface of a target metal marked with a plurality of welding site candidates, the system comprising:

an imager configured to acquire an image of the surface of the target metal including the plurality of welding site candidates, wherein the acquired image comprises a plurality of pixels with each pixel having a corresponding intensity value; and a processing circuit configured to:

receive the acquired image, compare each intensity value to an intensity threshold for pixel clustering, identify a plurality of pixel clusters, each pixel cluster corresponding to a different one of the plurality of welding site candidates, wherein each pixel cluster is a cluster of contiguous pixels that have intensity values that are equal to or greater than the intensity threshold, for each pixel cluster, determine whether a total pixel area making up the pixel cluster is less than a threshold pixel area, remove any pixel cluster from consideration as a welding site location if the total pixel area of the pixel cluster is less than the threshold pixel area, identify first remaining pixel clusters comprising at least one pixel cluster whose total pixel area is equal to or greater than the threshold pixel area, for each pixel cluster of the first remaining pixel clusters, determine a largest inscribed circle that is enclosed within the pixel cluster, compare a diameter of the largest inscribed circle with a threshold diameter corresponding to a dimension of a metal stud, and remove the pixel cluster from consideration as a welding site location if the diameter of the largest inscribed circle is less than the threshold diameter, identify second remaining pixel clusters comprising at least one pixel cluster whose diameter of the largest inscribed circle is equal to or greater than the threshold diameter, for each pixel cluster of the second remaining pixel clusters, determine a center of the largest inscribed circle that is enclosed within the pixel cluster as a center of the pixel cluster having an image-space coordinate, and convert the image-space coordinate to an object-space coordinate of a welding site location for a corresponding metal stud, and a controller configured to, for each pixel cluster of the second remaining pixel clusters, align a center of the corresponding metal stud with the object-space coordinate of the welding site location.

2. The system of claim 1, wherein the processing circuit is further configured to:

for each pixel cluster of the second remaining pixel clusters, determine a center of the pixel cluster, compare center-to-center distances between pixel clusters of the second remaining pixel clusters to a distance threshold, and remove at least one of the pixel clusters of the second remaining pixel clusters from consideration as a welding site location if the center-to-center distance to another pixel cluster is less than the distance threshold.

3. The system of claim 2, wherein the processing circuit is further configured to:

identify third remaining pixel clusters comprising at least one pixel cluster whose center-to-center distance is not less than the distance threshold with respect to any pixel cluster of the third remaining pixel clusters.

4. The system of claim 3, wherein the processing circuit is further configured to, for each pixel cluster of the third remaining pixel clusters:

determine a center of the largest inscribed circle that is enclosed within the pixel cluster as a center of the pixel cluster having an image-space coordinate, and convert the image-space coordinate to an object-space coordinate of a welding site location for a corresponding metal stud.

5. The system of claim 4, further comprising:

a controller configured to, for each pixel cluster of the third remaining pixel clusters, align a center of the corresponding metal stud with the object-space coordinate of the welding site location.

6. The system of claim 3, wherein the processing circuit is further configured to, for each pixel cluster of the third remaining pixel clusters:

determine whether a corresponding welding site location is within a minimum distance from any edge of the target metal, and remove the pixel cluster from consideration as a welding site location if the corresponding welding site location is within the minimum distance.

7. The system of claim 6, wherein the processing circuit is further configured to:

identify fourth remaining pixel clusters comprising at least one pixel cluster whose corresponding welding site location is not within the minimum distance from any edge of the target metal.

8. The system of claim 7, wherein the processing circuit is further configured to, for each pixel cluster of the fourth remaining pixel clusters:

determine a center of the largest inscribed circle that is enclosed within the pixel cluster as a center of the pixel cluster having an image-space coordinate, and convert the image-space coordinate to an object-space coordinate of a welding site location for a corresponding metal stud.

9. The system of claim 8, further comprising:

a controller configured to, for each pixel cluster of the fourth remaining pixel clusters, align a center of the corresponding metal stud with the object-space coordinate of the welding site location.

* * * * *